United States Patent
Bhuyan

(10) Patent No.: US 9,582,310 B2
(45) Date of Patent: Feb. 28, 2017

(54) METHOD AND APPARATUS FOR DETERMINING THE IDENTITY OF A VIRTUAL MACHINE

(71) Applicant: Brocade Communications Systems, Inc., San Jose, CA (US)

(72) Inventor: Prasanta Kumar David Bhuyan, Broomfield, CO (US)

(73) Assignee: Brocade Communications Systems, Inc., San Jose, CA (US)

( * ) Notice: Subject to any disclaimer, the term of this patent is extended or adjusted under 35 U.S.C. 154(b) by 0 days.

(21) Appl. No.: 14/608,007

(22) Filed: Jan. 28, 2015

(65) Prior Publication Data

US 2016/0216989 A1    Jul. 28, 2016

(51) Int. Cl.
*G06F 13/00*    (2006.01)
*G06F 9/455*    (2006.01)

(52) U.S. Cl.
CPC ............ *G06F 9/45558* (2013.01); *G06F 2009/45579* (2013.01); *G06F 2009/45595* (2013.01)

(58) Field of Classification Search
CPC .... G06F 9/4411; G06F 9/45533; G06F 9/541; G06F 13/102
USPC .............................. 718/1; 719/321, 326, 328
See application file for complete search history.

(56) References Cited

U.S. PATENT DOCUMENTS

| | | | |
|---|---|---|---|
| 6,397,242 B1 | 5/2002 | Devine et al. | |
| 6,714,992 B1 | 3/2004 | Kanojia | |
| 7,200,144 B2 | 4/2007 | Terrell et al. | |
| 7,478,173 B1 | 1/2009 | Delco | |
| 7,676,564 B2 * | 3/2010 | Raghavan | H04L 29/06 709/206 |
| 7,865,893 B1 | 1/2011 | Omelyanchuk et al. | |
| 7,921,431 B2 | 4/2011 | Smart | |
| 8,223,770 B2 | 7/2012 | Wray et al. | |
| 8,250,281 B2 * | 8/2012 | Bauman | G06F 9/5077 709/215 |
| 8,396,807 B1 | 3/2013 | Yemini et al. | |
| 9,325,524 B2 * | 4/2016 | Banavalikar | H04L 12/4633 |

(Continued)

OTHER PUBLICATIONS

Jibbe, M. K. Hammond-Doel, Tom; Wilson, Steven; "SNIA Tutorial—Fibre Channel Technologies: Current and Future". Oct. 29-31, 2007. Storage Networking Industry Association.

(Continued)

*Primary Examiner* — Andy Ho
(74) *Attorney, Agent, or Firm* — Blank Rome, LLP

(57) ABSTRACT

A hypervisor preferably provides VM (virtual machine) identification, priority and LUN/LBA range information to the HBA (host bus adapter) when a VM is created. Alternatively, the HBA can determine that a LUN/LBA range is new and request VM identity, priority and LUN/LBA range from the hypervisor. The HBA creates a table containing the VM identification, priority and LUN/LBA range. The HBA then detects operations directed to the LUN/LBA range and does a lookup to determine VM identification and priority. VM identification and priority are then mapped into a field in a frame using a unique identifier. The unique identifier can be placed using reserved bits on the existing Fiber Channel (FC) header or can use bits in an additional header, such as a modified IFR header or an optional device header. The VM identification aware HBAs register with the NS.

21 Claims, 20 Drawing Sheets

(56) References Cited

U.S. PATENT DOCUMENTS

| | | |
|---|---|---|
| 2006/0023707 A1 | 2/2006 | Makishima et al. |
| 2008/0155208 A1 | 6/2008 | Hiltgen et al. |
| 2010/0103939 A1 | 4/2010 | Carlson |
| 2010/0153947 A1* | 6/2010 | Haruma .............. G06F 9/45558 718/1 |
| 2011/0173608 A1 | 7/2011 | Buragohain et al. |
| 2011/0173609 A1 | 7/2011 | Buragohain et al. |
| 2014/0165062 A1 | 6/2014 | Buragohain et al. |
| 2015/0288570 A1 | 10/2015 | Astigarraga |

OTHER PUBLICATIONS

American National Standard for Information Technology—Fibre Channel—Physical and Signalling Interface-3 (FC-PH-3), ANSI X3.303-1998, Apr. 1998, 116 pages.

\* cited by examiner

Fig. 6

| Bit Word | 31 .. 24 | 23 .. 16 | 15 .. 08 | 07 .. 00 |
|---|---|---|---|---|
| 0 | R_CTL | D_ID | | |
| 1 | CS_CTL | S_ID | | |
| 2 | TYPE | F_CTL | | |
| 3 | SEQ_ID | DF_CTL | SEQ_CNT | |
| 4 | OX_ID | RX_ID | | |
| 5 | Parameter | | | |

| Bits | Abbr. | Meaning |
|---|---|---|
| 31 | PREF | 0=No Preference<br>1=With Preference |
| 30 | | Reserved |
| 29-24 | DSCP | Differentiated Services Code Point |

METHOD AND APPARATUS FOR DETERMINING THE IDENTITY OF A VIRTUAL MACHINE

CROSS REFERENCE TO RELATED APPLICATIONS

This is related to U.S. patent application Ser. No. 12/838,624, entitled "Method and Apparatus for Providing Virtual Machine Information to a Network Interface," filed Jul. 19, 2010, which application claims the benefit under 35 U.S.C. §119(e) of U.S. Provisional Patent Application Ser. No. 61/228,127 entitled "Virtual Machine Identification in Packets Transmitted over a Network," filed Jul. 23, 2009, both of which are hereby incorporated by reference.

This application is also related to U.S. patent application Ser. No. 12/838,627 entitled "Method and Apparatus for Determining the Identity of a Virtual Machine," filed Jul. 19, 2010, which is hereby incorporated by reference.

This application is also related to U.S. patent application Ser. No. 14/608,001, entitled "Method and Apparatus for Providing Virtual Machine Information to a Network Interface" and Ser. No. 14/608,013, entitled "Method and Apparatus for Registering and Storing Virtual Machine Unique Information Capabilities", both filed on the same day as this application and both hereby incorporated by reference.

BACKGROUND OF THE INVENTION

1. Field of the Invention

The present invention relates generally to storage area networks. Particularly, the present invention relates to operation of storage area networks with attached hosts running virtualization software and having a plurality of virtual machines.

2. Description of the Related Art

Virtual machines (VMs) are being used in increasing numbers in networks. They are advantageous because they maximize the use of the hardware resources in the network, particularly the host or server hardware. However, the use of virtual machines presents problems when the host machine is connected to a storage area network (SAN). For a number of reasons it is desirable to have visibility of the particular virtual machines in the various hosts on the SAN. These reasons include simplified management through the use of a single management tool, cost back charging relating to resource use, service level agreement enforcement, isolation and improved quality of service (QoS) or prioritization of the communications for given VMs.

Current VM hypervisors do not readily provide this capability. For example, in VMware, the VMs can be separately identified on the SAN if they use the NPIV features provided by the host bus adaptors (HBAs). But to use NPIV, the VM must be setup to use raw device mapping (RDM) of the hypervisor. This results in management difficulties in both the hypervisor and on the SAN. On the SAN, zoning becomes very complicated as each VM must be operated on individually. Similarly, SAN QoS is also more difficult to manage because of the individual nature of the VMs and their NPIV addresses. In addition, as the environment scales up, the problems increase at a greater rate.

VMware ESX, the prevalent hypervisor, provides an alternate technique referred to as VMFS or virtual machine file system. It is much easier to administer VMs when VMFS is used, so the majority of server administrators would prefer to utilize VMFS. But VMFS does not allow identification on the SAN of the individual VMs. Currently NPIV cannot be used, even with its attendant SAN management issues. So the inability to manage, charge back and so on has limited the use of hypervisors using VMFS operation on the SAN.

Similar issues are present with Hyper-V from Microsoft and its clustered shared volume (CSV) file system and XenServer from Citrix with the Control Domain and Storage Repositories.

As VMFS or CSV, depending on the hypervisor, is the greatly preferred technique for providing storage resources in a hypervisor, it would be desirable to be able to better operate with VMFS or CSV-based systems on a SAN.

SUMMARY OF THE INVENTION

According the embodiments of the present invention, the hypervisor preferably provides VM identification, priority and LUN/LBA range information to the HBA or network interface when a VM is created and provides VM identification at the beginning of each new command. Alternatively, the HBA or network interface can determine that a VM or LUN/LBA range is new and request VM identity, priority and LUN/LBA range from the hypervisor. The HBA creates a table containing the VM identification, priority and LUN/LBA range. The HBA then detects operations directed to the VM or LUN/LBA range and does a lookup to determine priority. VM identification and priority are then mapped into a field in a frame using a unique identifier. The unique identifier can either be placed using reserved bits on the existing Fibre Channel (FC) header or can use bits in an additional header, such as a modified IFR header or an optional device header. With the unique identifier in the frame, fabric wide handling of the frames for QoS is greatly simplified as the unique identifier can be directly mapped to SLAs and priority levels. Additionally, statistics based on the frames can also readily be developed based on particular VMs to allow greatly improved chargeback mechanisms and the like. Further, the presence of the unique identifier allows improved management of the SAN as operations can be traced back directly to individual VMs, not just physical hosts, for operations such as zoning and access control.

The unique identifier can also be used in the storage devices. One particular use is to incorporate the VM instance into the caching algorithm, with per VM caching, not just per host caching.

The VM identification capability of the HBA can be registered with the name server to allow querying to determine the presence of other VM identification capable HBAs. The optional device header then can be added if the target is also VM identification aware.

BRIEF DESCRIPTION OF THE DRAWINGS

The present invention has other advantages and features which will be more readily apparent from the following detailed description of the invention and the appended claims, when taken in conjunction with the accompanying drawings, in which:

FIG. 6 is a diagram of a Fibre Channel packet header according to one embodiment of the present invention.

DETAILED DESCRIPTION OF THE PREFERRED EMBODIMENTS

Figure 1:
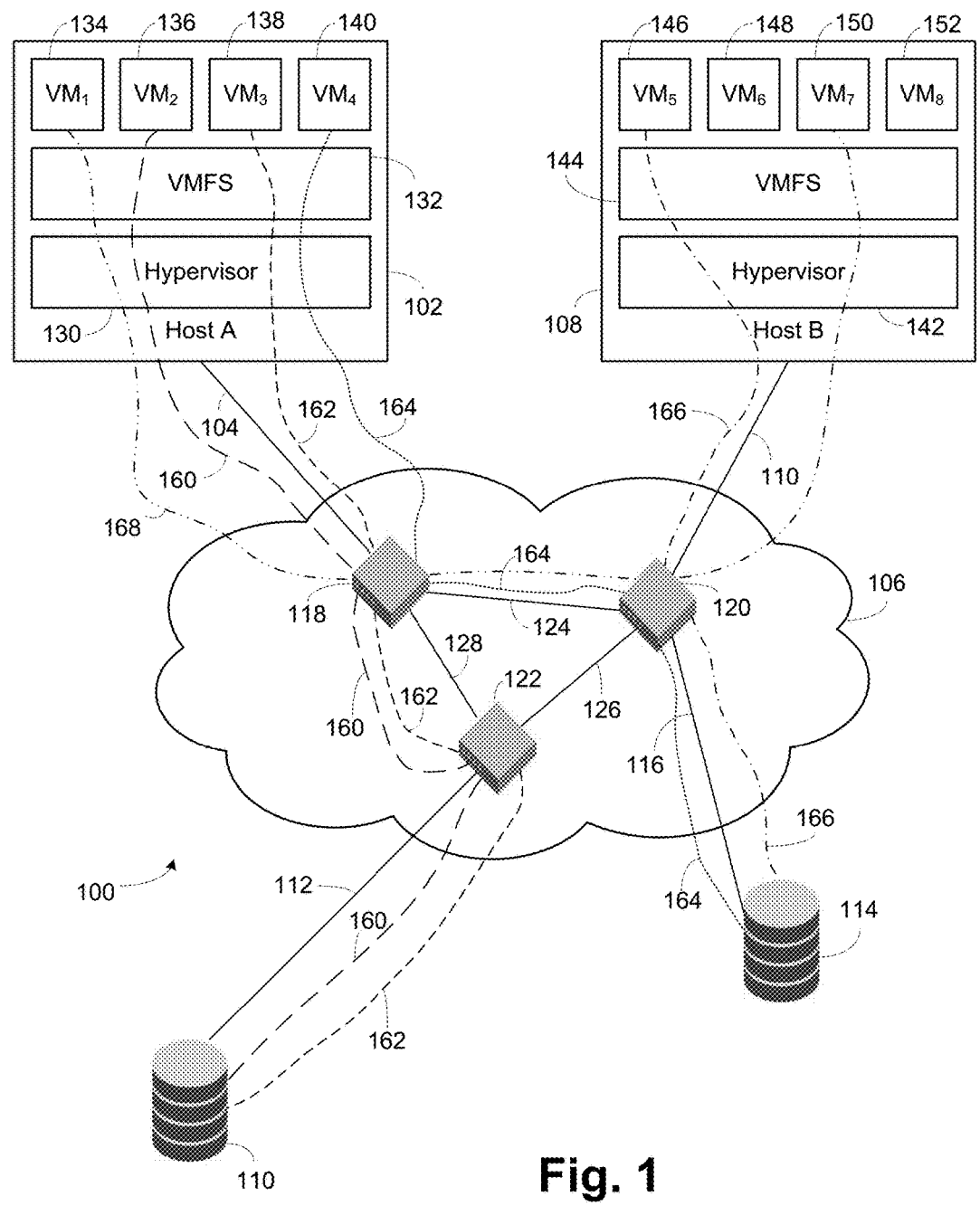
FIG. 1 illustrates a storage area network with various connected virtual machines and storage units according to an embodiment of the present invention.

FIG. 1 illustrates a block diagram of a storage area network (SAN) 100. A host 102 is connected by a link 104 to a network 106. Similarly a host 108 is connected by a link no to the fabric 106. A storage unit no is connected by a link 112 to the fabric 106, while a storage unit 114 is connected by a link 116 to the fabric 106. A series of three switches 118, 120, 122 form the illustrated fabric 106. The link 104 is connected to switch 118, the link no is connected to switch 120, the link 112 is connected to switch 122 and the link 116 is connected to switch 120. Each of the switches 118, 120, 122 are interconnected by links 124, 126 and 128.

The host 102 includes a hypervisor 130 which executes a virtual machine file system (VMFS) 132. A series of virtual machines in $VM_1$-$VM_4$ 134-140 execute on top of the VMFS 132. Similarly the host 108 includes a hypervisor 142, a VMFS 144 and virtual machines $VM_5$-$VM_8$ 146-152.

Illustrated in FIG. 1 is a path 160 from $VM_2$ 136 to storage unit 110. This path 160, indicated by the long dashed line, traverses the VMFS 132 to the hypervisor 130, the link 104, the switch 118, the link 128, the switch 122 and the link 112. $VM_3$ 138 has a similar path 162 to storage unit 110. $VM_4$ 140 has a path 164 which traverses the VMFS 132, the hypervisor 130, the link 140, the switch 118, the link 124, the switch 120 and the link 116 to reach storage unit 114. The $VM_5$ 146 has a path 166 which traverses the VMFS 144, the hypervisor 142, the link 110, the switch 120 and the link 116 to the storage unit 114. A path 168 connects $VM_1$ 134 to $VM_7$ 150 by traversing the VMFS 132, the hypervisor 130, HBA A (not shown) in host 102, the link 104, the switch 118, the link 124, the switch 120, the link 110, an HBA B (not shown) in host 108, hypervisor 142 and VMFS 144.

Packets or frames, the terms being used synonymously in this description, of $VM_2$ 136 and $VM_3$ 138 travel identical routes to the storage unit 110, so it is very difficult to determine which packets were related to which path and therefore it is very difficult to prioritize the two sets of packets differently. $VM_4$ 140 in the host 102 and $VM_5$ 146 in the host 108 use different routes to contact storage unit 114 and would have different source addresses, but if $VM_4$ 140 were transferred to host 108 using VMotion, then the paths would align and the same difficulty would appear as with $VM_2$ 136 and $VM_3$ 138.

Figure 2A:
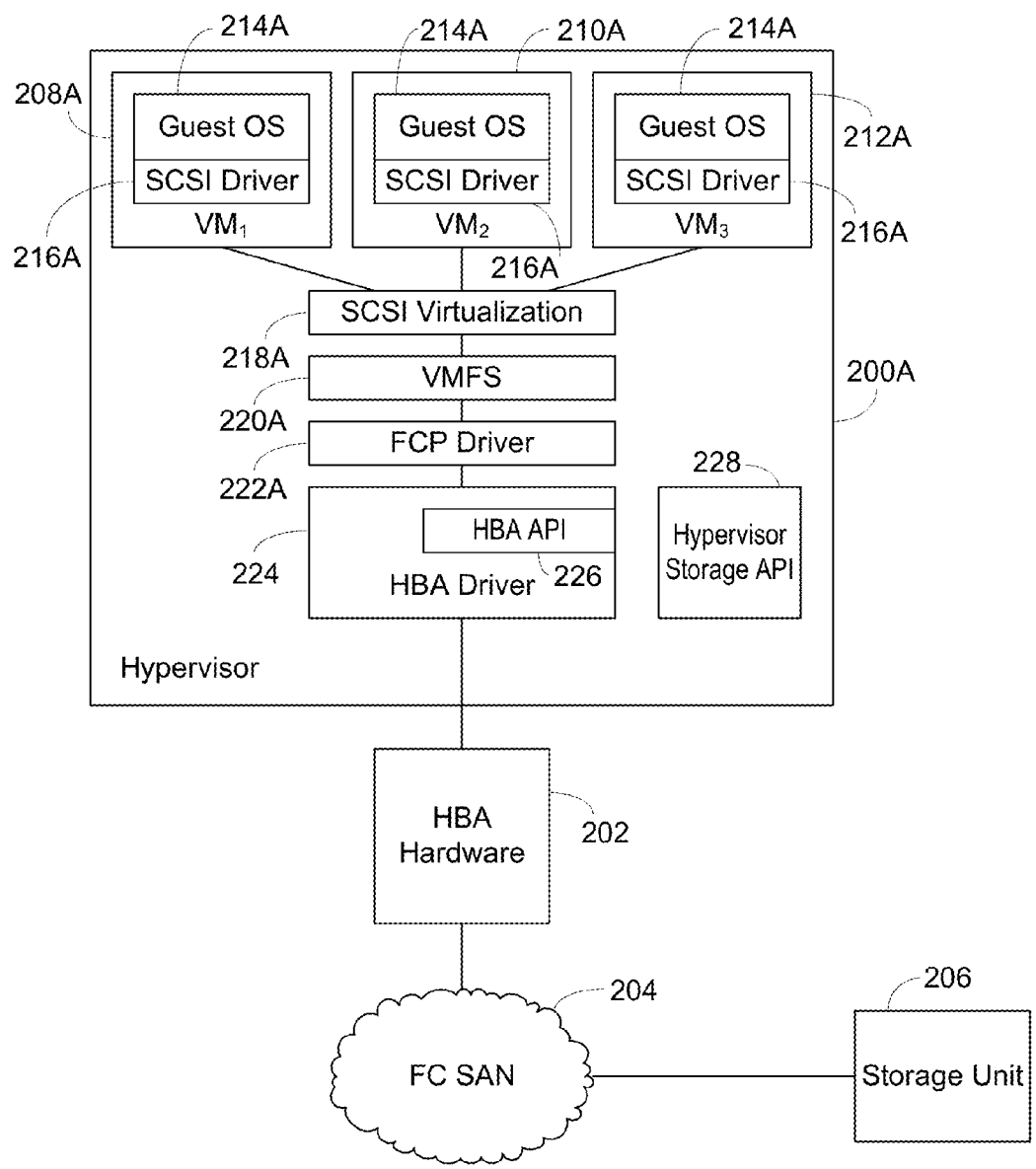
FIG. 2A illustrates a software stack for use with an HBA according to an embodiment of the present invention, with connection to an FC SAN and a storage unit included.

FIG. 2A illustrates the software stack of a host 200A executing a hypervisor, such as VMware $ESX_2$ which is connected to host bus adapter (HBA) hardware 202, the hardware portion of the exemplary network interface, which in turn is connected to a Fibre Channel (FC) SAN 204, which is also connected to a storage unit 206. The host 200A includes the VM 208A, $VM_2$ 210A and $VM_3$ 212A. Each virtual machine 208A, 210A and 212A includes a guest operating system (OS) 214A and a SCSI driver 216A. The SCSI driver 216A is connected to a SCSI virtualization layer 218A provided by the hypervisor present in the host 200A. The SCSI virtualization layer 218A is connected to the VMFS 220A, which is the virtualization storage layer. The VMFS 220A is connected to an FCP driver 222A to convert the SCSI commands to the FC FCP commands. The FCP driver 222A is connected to an HBA driver 224, the software portion of the exemplary network interface, which is also connected to the HBA hardware 202. The HBA driver 224 receives the FCP packets and blocks from the FCP driver 222A and interacts with the HBA hardware 202 to provide packets to the FC San 204 for delivery to the storage unit 206. The HBA driver 224 includes an HBA API 226, while the hypervisor provides a hypervisor storage API 228.

Figure 2B:
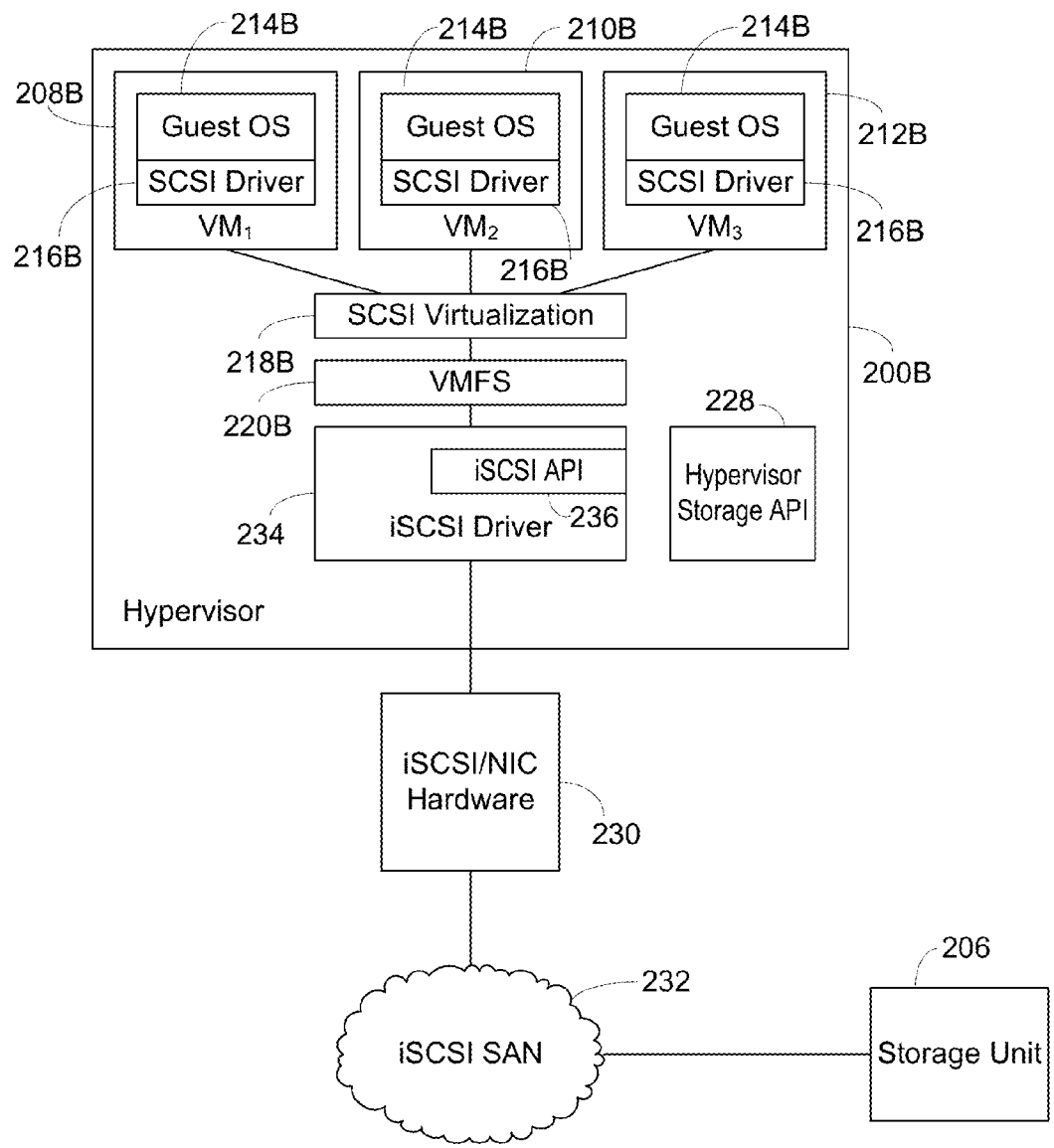
FIG. 2B illustrates a software stack for use with an iSCSI or Ethernet network interface card according to an embodiment of the present invention, with connection to an iSCSI SAN and a storage unit included.

In FIG. 2B a host 200B executing a hypervisor which is operating with an SCSI/network interface card (NIC) hardware 230, which in turn is connected to an iSCSI SAN 232, which is connected to the storage unit 206. Elements and items similar to those shown in FIG. 2A receive the same numbering with the addition of the letter B. Thus VMFS 220B is connected to an iSCSI driver 234. The iSCSI driver 234 includes an iSCSI API 236 which operates similarly to the HBA API 226.

Figure 2C:
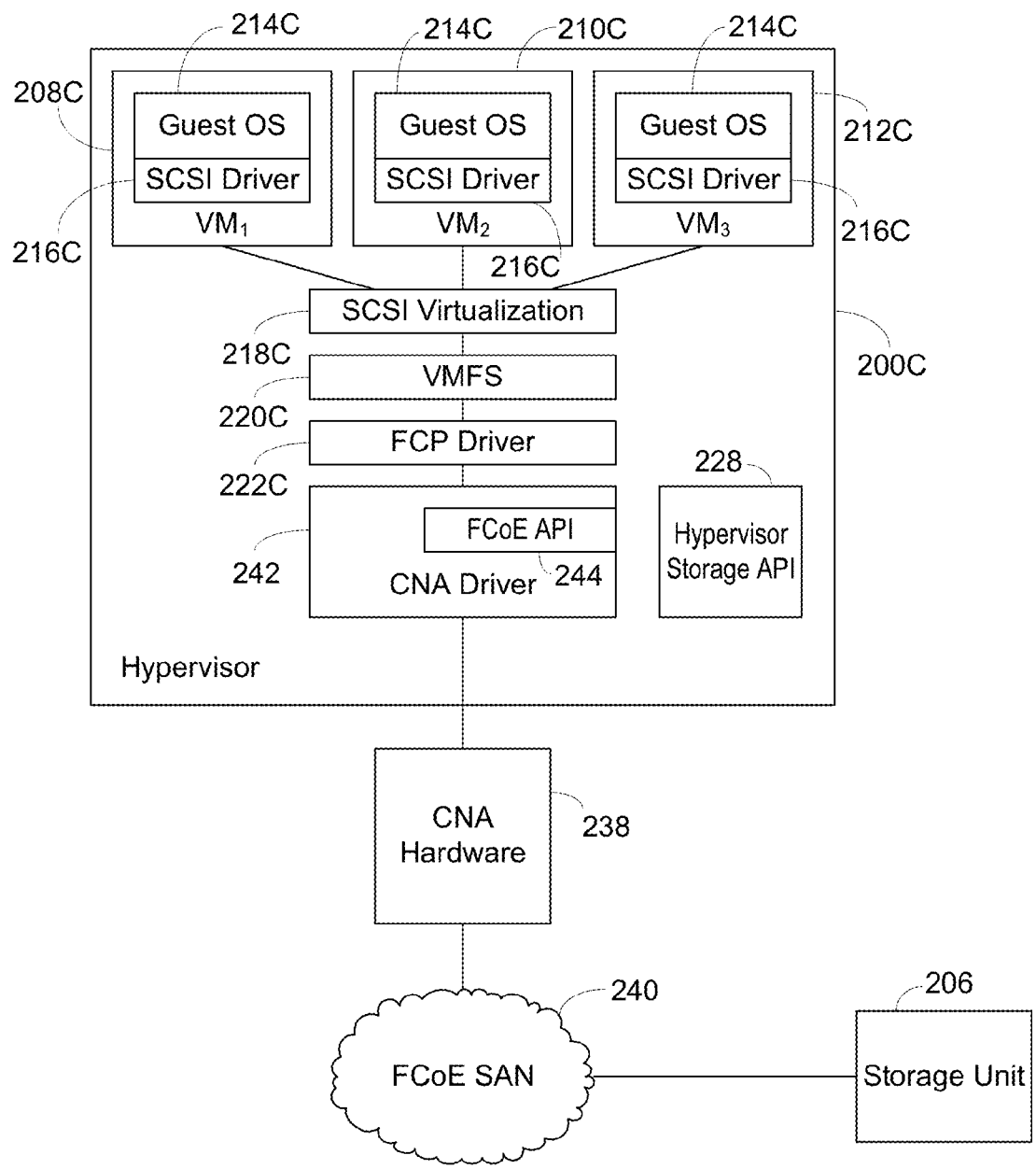
FIG. 2C illustrates a software stack for use with an FCoE converged network adaptor according to an embodiment of the present invention, with connection to an FCoE SAN and a storage unit included.

In FIG. 2C a host 200C executing a hypervisor is connected to converged network adapter (CNA) hardware 238, which is connected to a Fibre Channel over Ethernet (FCoE) SAN 240, which is connected to the storage unit 206. Similar elements in FIG. 2C to those of FIG. 2A are numbered similarly and end with the letter C. The VMFS layer 220C is connected to an FCP driver 222C, with the FCP driver 222C connected to a CNA driver 242. The CNA driver 242 is connected to the CNA hardware 238. The CNA driver 244 includes an FCoE API 244 which operates similarly to the HBA API 226.

Figure 3:
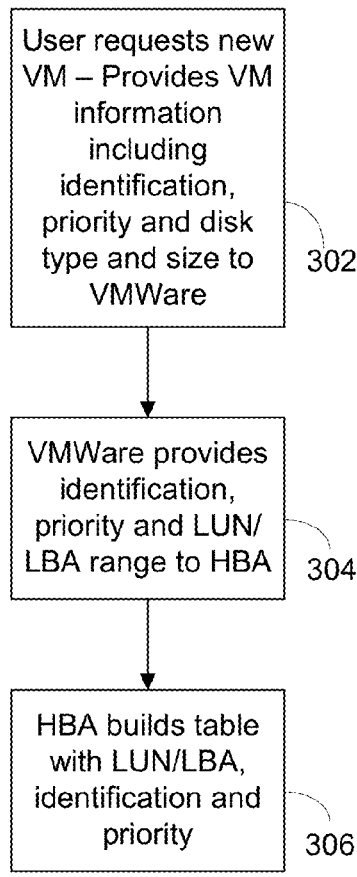
FIG. 3 illustrates a flowchart of operations when a VM is created according to an embodiment the present invention.

FIG. 3 illustrates a flowchart for obtaining desired VM information when the VM is created. In step 302 a user or administrator requests a new VM be set up according to the techniques for the particular hypervisor. This description will focus on VMware ESX, but it is understand that other hypervisors, such as Microsoft Hyper-V and the like, can replace ESX. The hypervisor requests various information from the user to set up the VM, such as identification, priority, disk type and disk size. For ESX, the disk type can be RDM or VMFS. Of importance in this description is the use of VMFS as the disk type, for reasons discussed above. For Hyper-V the equivalent is CSV. The identification can be a single value representing just the particular VM or can be multiple values, such as a group value and an individual value. The use of a group value allows management of a plurality of VMs directly as a group, without the need to combine VMs with a management tool. The priority can be a value such as high, medium or low. ESX, in step 304, then provides the identification, priority and LUN/LBA range to the HBA driver 224 for the particular HBA 202 using the HBA API 226. In step 306 the HBA driver 224 then loads this information into a table. The table forms the basis for detection of the particular VM in commands provided to the HBA 202 and includes other values such as S_ID and D_ID of the various relevant units.

Figure 4:
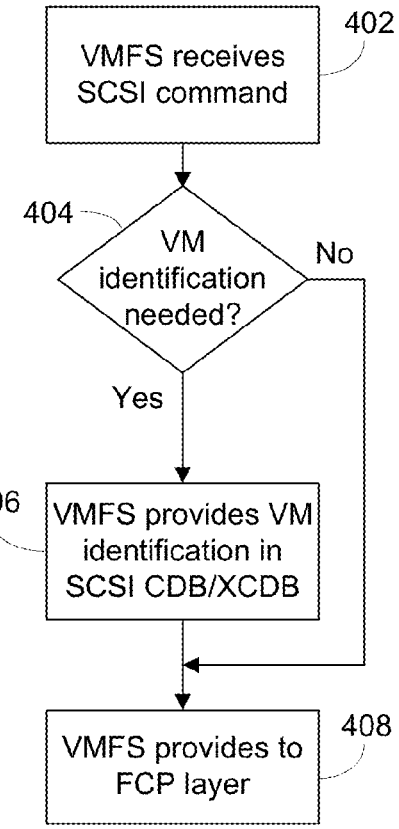
FIG. 4 illustrates storage software operations when a new SCSI command is received according to an embodiment of the present invention.

In FIG. 4 at step 402 the VMFS 220A receives a SCSI command provided from the guest operating system 214A through the SCSI driver 216A and the SCSI virtualization layer 218A. In step 404 the VMFS 220A determines if virtual machine identification is needed to be provided in the SCSI command. If so, control proceeds to step 406 where the VMFS 220A places VM identification values in either the SCSI CDB or an extended CDB. If no identification is needed or used, as done in selected embodiments, or after the VM identification has been provided in step 406, control proceeds to step 408 where the VMFS 220A provides the SCSI CDB to the FCP driver 222A.

Figure 5:
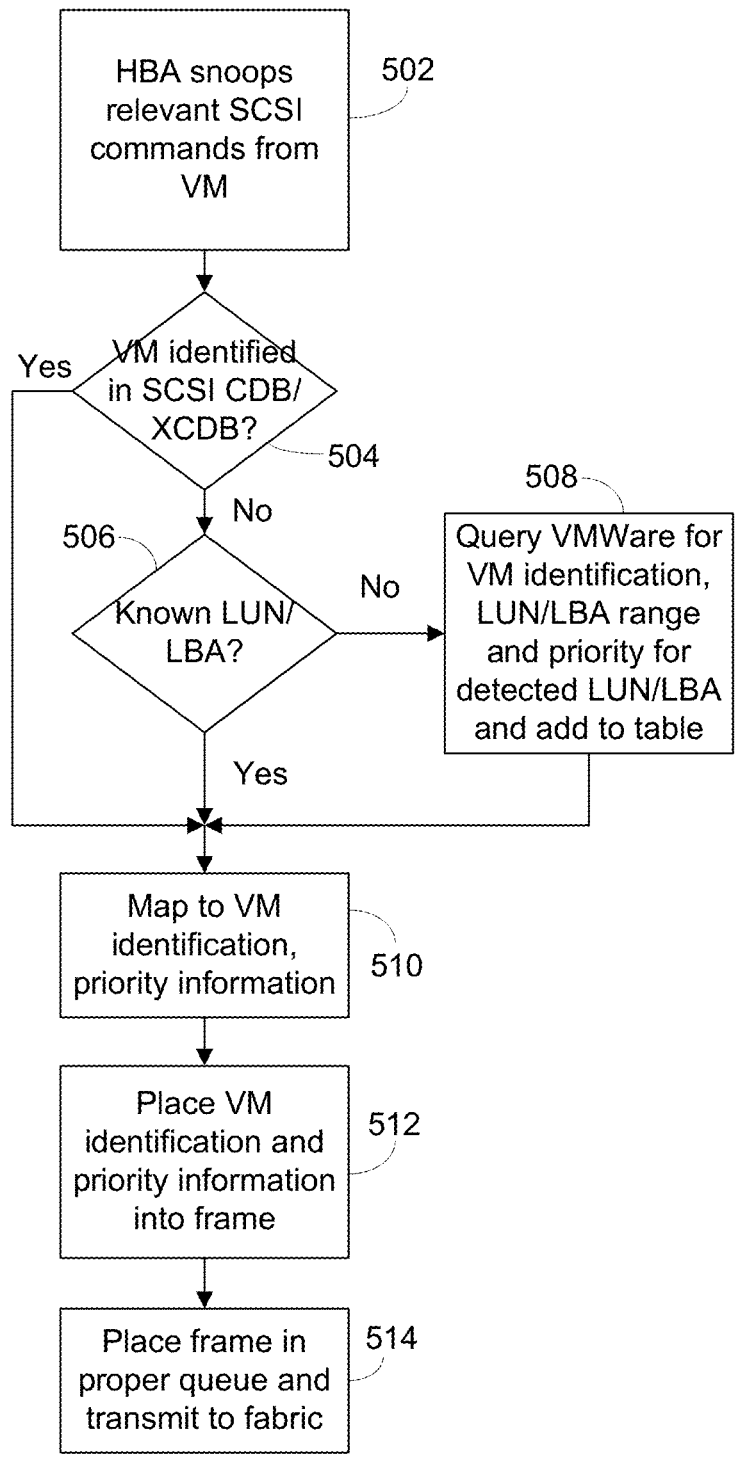
FIG. 5 illustrates a flowchart of HBA operations according to an embodiment of the present invention.
Figure 7:
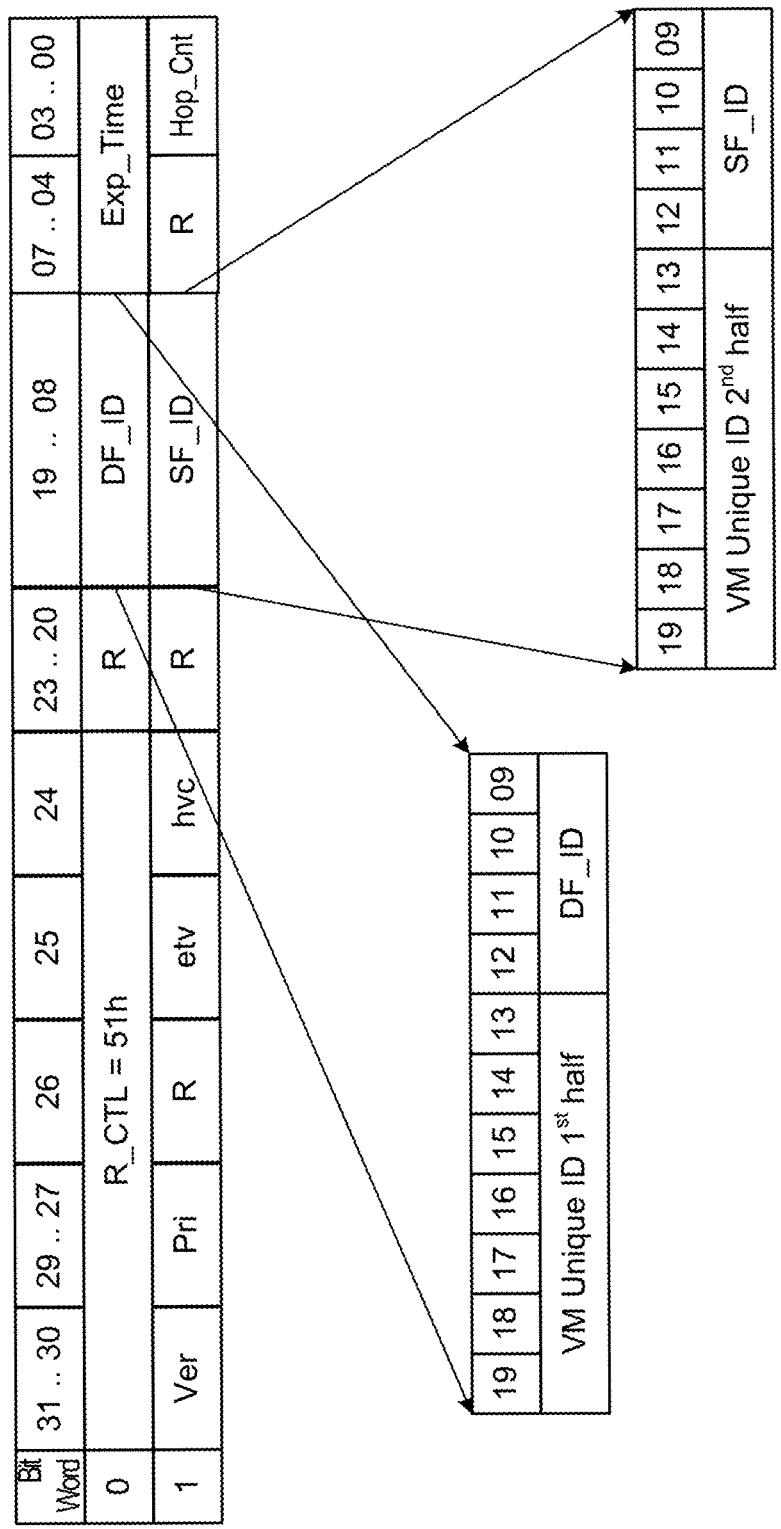
FIG. 7 is a diagram of a Fibre Channel packet header according to one embodiment of the present invention.

FIG. 5 illustrates a flowchart of the HBA 202 determining the VM for a particular frame and then loading a unique identifier into the frame for use in the remainder of the fabric. In step 502 the HBA 202 snoops the received command, typically an FCP command, for the command type, VM identification value, LUN and LBA range. In step 504 the HBA 202 compares any detected VM identification information to the table built using step 306. If there is a miss, indicating either a new VM or that the VMFS 220 has not added VM identifiable values, as can be the case in selected embodiments, control proceeds to step 506 to compare the LUN and LBA values to the table. If there is a miss, indicating a new LUN/LBA, this is an indication that a new VM needs to be included in the table. In that case, in step 508 the HBA driver 224 queries the ESX through the hypervisor storage API 228 to obtain the VM identification, priority and LUN/LBA range. The returned values are loaded into the table. This operation can be done in parallel with dropping or rejecting the received command to allow time to do the query and set up the table entry. This will not be a significant performance delay because the first command will typically be a command such as an inquiry, a command which has a longer response time, thus reducing the practical performance degradation. Further, it will only have to be done once per VM, as the table entry will be used in all later operations. If the VM was identified, the LUN/LBA are known or after step 508, in step 510 the table is used to map to a unique identifier and the priority information developed for this particular VM. In step 512 that unique identifier and any additional priority information are placed into the frame built using the received FCP command. In one embodiment the unique identifier is placed in reserved bits in the CS_CTL field of the FC header, as shown in FIG. 6. However, this is a limited number of bits, so the number of unique identifiers is smaller than generally desired. This embodiment does have the advantage of not adding any bits or headers to frames. In a second embodiment a modified IFR or interfabric router header as defined in the FC_IFR specification is pre-pended to the frame, as shown in FIG. 7. As the IFR header is a standard frame header, processing is currently being done with those headers. One option is to combine the unique identifier and the fabric ID in a fabric ID field, SF_ID or DF_ID or both fabric ID fields. This will allow significantly more bits to be available for the unique identifier as the fabric ID values are usually only a limited number of bits. If necessary, a new R_CTL value, such as 53h, can be used to identify the frame. Other variations can also be used. In step 514 the frame is placed in the proper queue in the HBA 202 and transmitted to the fabric 204. Preferably the HBA 202 includes various queues used for QoS reasons, so the frame can be processed and handled correctly from the beginning.

Return frames from the storage unit 206 can be developed at least two different ways. First, the storage unit 206 can include an HBA similar to HBA 202 in that it can provide the unique identifier in any return frames. The storage unit HBA stores the unique identifier information in its context tables and builds the proper frame structure to allow the inclusion of the unique identifier. Second, if the storage unit cannot provide the unique identifier, the switches that form the FC SAN 204 can monitor for return frames having a D_ID and OXID that match the S_ID and OXID of the frames that included the unique identifier. Upon detecting the D_ID and OXID match for a frame that does not include the unique identifier, the switch can then reformat the frame to include the unique identifier. This allows the various operations to be done on both flow directions.

An alternative to the HBA 202 doing the command snooping and the placement of the unique identifier in the frame is to have the snooping and unique identifier insertion done by the switch connected to the HBA 202. The switch needs to receive the VM identification, priority and LUN/LBA range to allow the snooping of received frames. The snooping is much like that done by the HBA 202 in step 502 except that it is done on the normal frames provided by the HBA 202. In one variation the VM identification, priority and LUN/LBA range are provided from the HBA 202 to the switch in command packets, so that the HBA 202 retains the interface with the VM. In this case the switch will also communicate with the HBA 202 to request the VM identification, priority and LUN/LBA range for frames that miss the table in the switch. The HBA 202 will do the query described above and provide the information to the switch. This variation minimizes the work being performed in the HBA 202 to just the simple interfaces with the VM and leaves the snooping and frame development to the more powerful switch. A second variation has the hypervisor providing the VM identification, priority and LUN/LBA range directly to the switch. In this variation the APIs are effectively between the switch and the hypervisor, not the HBA 202 and the VMFS. This is less desirable as new commands and the like have to be developed for both the hypervisor and the switches. A third variation has the hypervisor and the switch cooperating with a management entity, which effectively has the APIs shown in the HBA of FIG. 2A. This is simpler than the second variation as the interfaces will be more easily developed, but will require the constant operation of the management entity.

The frame provided to the fabric includes the unique identifier of the VM. The various devices in the fabric can examine the frame to determine the unique identifier and use that as an entry into tables which define the priority and handling of the frame. This information is provided across the fabric using a management tool which can select a VM from the information present in the HBA 202 and then propagate necessary priority and handling information appropriate for each device in the fabric to those devices. Thus the user or administrator need only use one management tool to track the VM through the SAN 204 and then obtain desired information, such as traffic information used for charging back to the proper department. The management tool will also be able to simply define the SLA of the VM and set the priority and handling of the frames across the fabric accordingly. And it is noted that all of this is done with the hypervisor using a file system such as VMFS which does not readily provide information about the VMs to the HBA. It is also noted that no changes need to be made to modules such as VMFS. The minimal operation uses an API from the HBA driver 224 back into the hypervisor via the hypervisor storage API 228, with the preferred operation also including the hypervisor proactively providing VM information to the HBA driver 224 on VM creation or modification.

Figure 8:
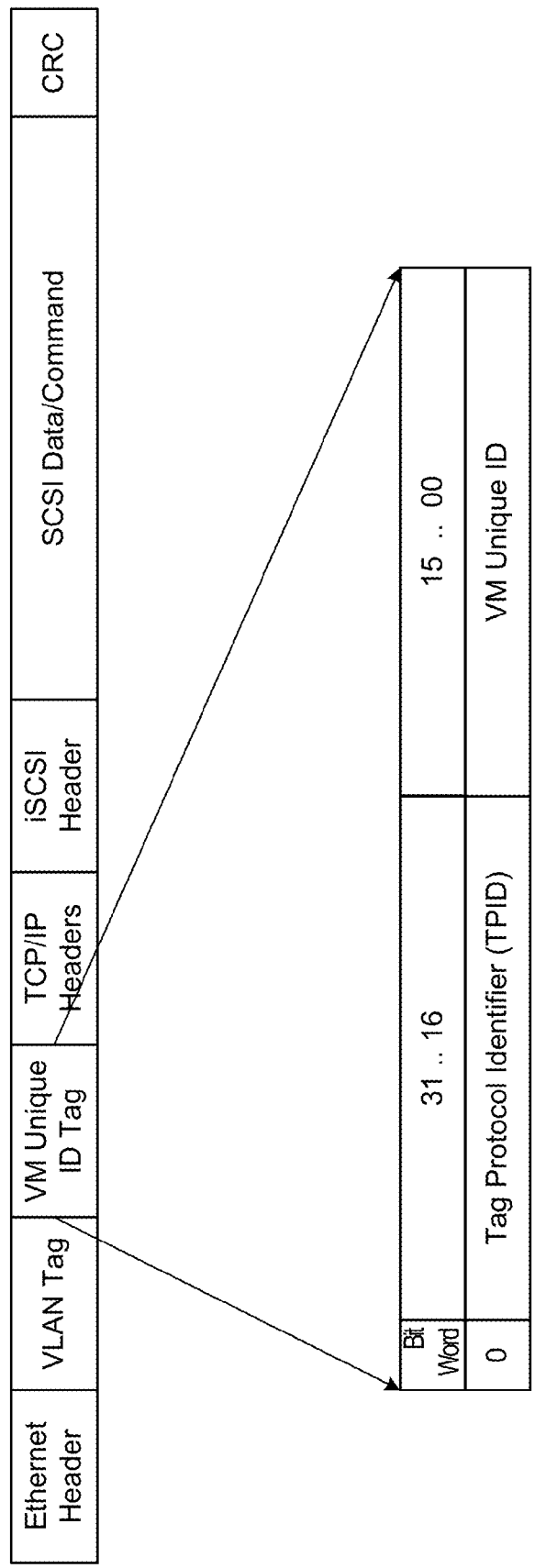
FIG. 8 is a diagram of an iSCSI packet according to one embodiment of the present invention.
Figure 9:
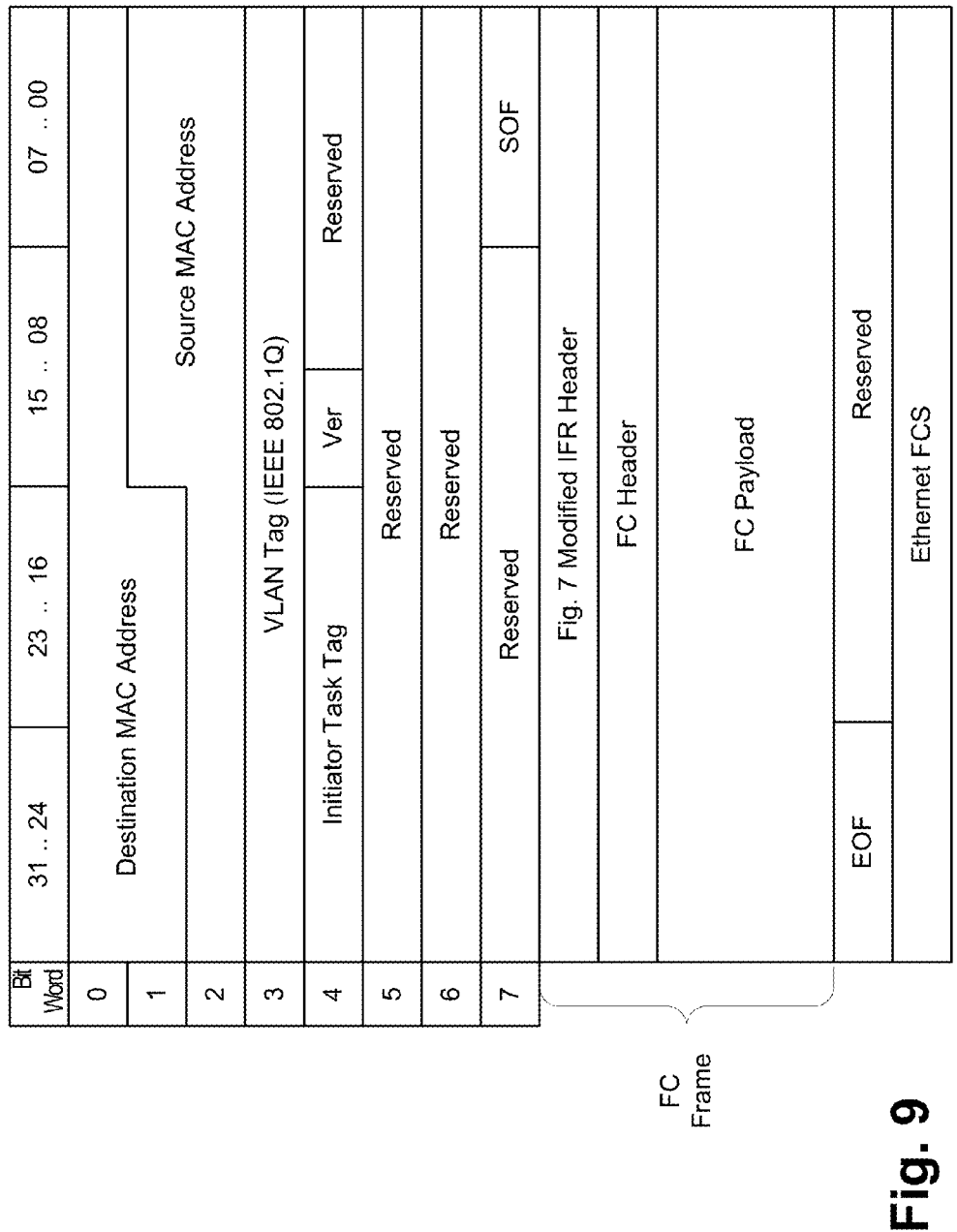
FIG. 9 is a diagram of an FCoE packet according to one embodiment of the present invention.

While the above description has focused on operations using the FC HBA 202, similar operations occur with iSCSI and FCoE variations, with the iSCSI driver 234 and iSCSI/NIC hardware 230 or CNA driver 242 and CNA hardware 238 being substituted for the HBA driver 224 and HBA hardware 202. Similarly, switch operations for the embodiments would be done by the Ethernet switches forming the iSCSI SAN 232 or FCoE SAN 240. In iSCSI frames, the unique identifier can be placed in a new tag similar to a VLAN tag as shown in FIG. 8, or at some possible location in the frame. In FCoE frames, the unique identifier can be placed in the FC frame as described above as shown in FIG. 9.

Various fabric level operations can be performed using the unique identification value representing the VM provided in the frames. These include quality of service (QoS); encryption and/or compression by VM; zoning; access control; migration of VMs between hosts in the same or different data centers, fabrics or network clouds (and other VMotion aspects); improved statistics by VM and federated management of the SAN.

The following U.S. patents or applications are incorporated by reference to provide further details relating to QoS usage of the VMs: U.S. Pat. No. 7,239,641, entitled "QUALITY OF SERVICE USING VIRTUAL CHANNEL TRANSLATION; U.S. Pat. No. 7,426,561, entitled CONFIGURABLE ASSIGNMENTS OF WEIGHTS FOR EFFICIENT NETWORK ROUTING"; Ser. No. 11/782,894 filed Jul. 25, 2007, entitled "METHOD AND APPARATUS FOR DETERMINING BANDWIDTH-CONSUMING FRAME FLOWS IN A NETWORK;" Ser. No. 11/674,637, filed Feb. 13, 2007, entitled "QUALITY OF SERVICE USING VIRTUAL CHANNEL TRANSLATION;" Ser. No. 12/119,440, filed May 12, 2008, entitled "AUTOMATIC ADJUSTMENT OF LOGICAL CHANNELS IN A FIBRE CHANNEL NETWORK;" Ser. No. 12/119,436, filed May 12, 2008, entitled "METHOD AND SYSTEM FOR FACILITATING APPLICATION-ORIENTED QUALITY OF SERVICE IN A FIBRE CHANNEL NETWORK;" Ser. No. 12/119,448, filed May 12, 2008, entitled "METHOD AND SYSTEM FOR CONGESTION MANAGEMENT IN A FIBRE CHANNEL NETWORK;" Ser. No. 12/119,457, filed May 12, 2008, entitled "WORKLOAD MANAGEMENT WITH NETWORK DYNAMICS;" and Ser. No. 12/119,430, filed May 12, 2008, entitled "METHOD AND SYSTEM FOR FACILITATING QUALITY OF SERVICE IN EDGE DEVICES IN A FIBRE CHANNEL NETWORK."

The following U.S. patent is incorporated by reference to provide further details relating to encryption and/or compression usage of the VMs: U.S. Pat. No. 7,533,256, entitled "METHOD AND APPARATUS FOR ENCRYPTION OF DATA ON STORAGE UNITS USING DEVICES INSIDE A STORAGE AREA NETWORK FABRIC."

The following U.S. patents or applications are incorporated by reference to provide further details relating to zoning usage of the VMs: U.S. Pat. No. 7,366,194, entitled "FIBRE CHANNEL ZONING BY LOGICAL UNIT NUMBER IN HARDWARE" and U.S. Pat. No. 7,352,740, entitled "EXTENT-BASED FIBRE CHANNEL ZONING IN HARDWARE."

The following U.S. application is incorporated by reference to provide further details relating to migration and VMotion usage of the VMs: Ser. No. 10/356,659, filed, Jan. 31, 2003, entitled "METHOD AND APPARATUS FOR PROVIDING VIRTUAL PORTS WITH ATTACHED VIRTUAL DEVICES IN A STORAGE AREA NETWORK."

The knowledge of the VMs provided in the frames can also be used by the storage devices connected to the fabric. One common operation in a storage device is caching of data. By detecting the VMs based on the unique identifier in the frames, the caching algorithm employed in the storage unit can be improved by breaking down to the VM level, rather than the S_ID or host address level as done today. A combination of caching algorithms could be used, some by address and some by VM. The details of the caching could also be varied between VMs based on priority values.

As discussed, VMware ESX is used as the described embodiment but various other hypervisors can be used, such as Microsoft's Hyper-V with CSV, other variations of VMware products and other vendor products. Further, the preferred embodiment was discussed based on a FC SAN environment. Other SANs, such as iSCSI and FCoE can also be used, alone or in combinations as illustrated in FIGS. 2B and 2C, with appropriate changes to FIGS. 3, 4 and 5.

The basic alternate embodiments and operations have been described above. The following description provides an additional embodiment where the VMs are identified in an optional FC header with additional general and detailed operations to provide more context for the embodiments of the present invention.

Figure 10:
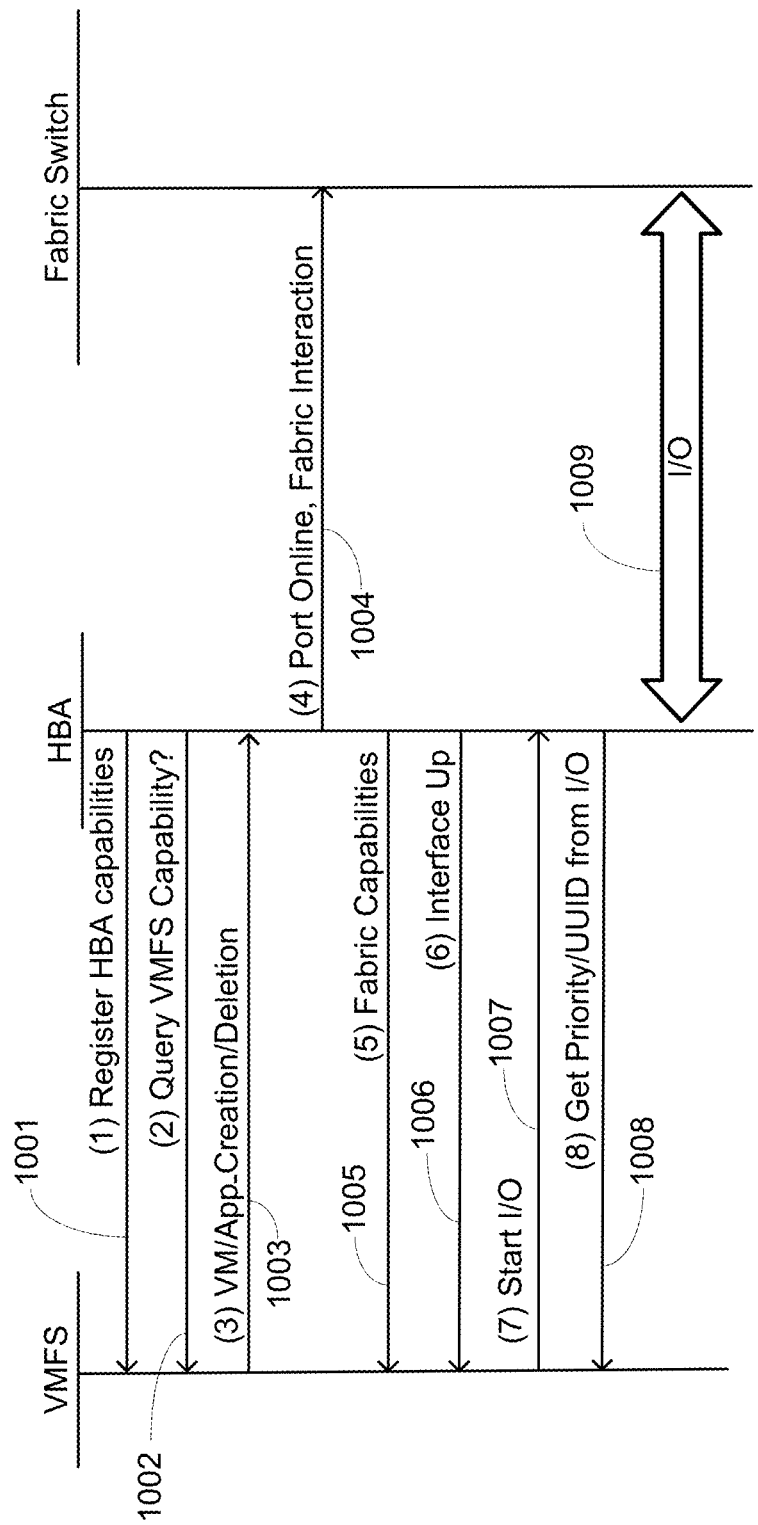
FIG. 10 is a sequence diagram of operations prior to data transfer according to one embodiment of the present invention.

Referring to FIG. 10, operations prior to commencing I/O transfers are shown. In operation 1001 the HBA registers with VMFS and provides its capabilities. This can be done using the hypervisor storage API 228. In operation 1002 the HBA queries VMFS to determine the capabilities of VMFS as compared to the HBA. In operation 1003 VMFS provides the information on a newly created VM, as in step 304 of FIG. 3. In operation 1004 the HBA port goes online and performs initial fabric operations. In operation 1005 the HBA provides the fabric capabilities to VMFS and in operation 1006 indicates that the HBA is ready for operation. In operation 1007 VMFS begins I/O operations. In operation 1008 the HBA queries for the priority and UUID of the VM involved in the I/O operation, similar to step 508 of FIG. 5. It is understood that operation 1008 may not be needed if the UUID of the VM has previously been provided to the HBA in operation 1003. Then I/O operations 1009 commence.

Figure 11:
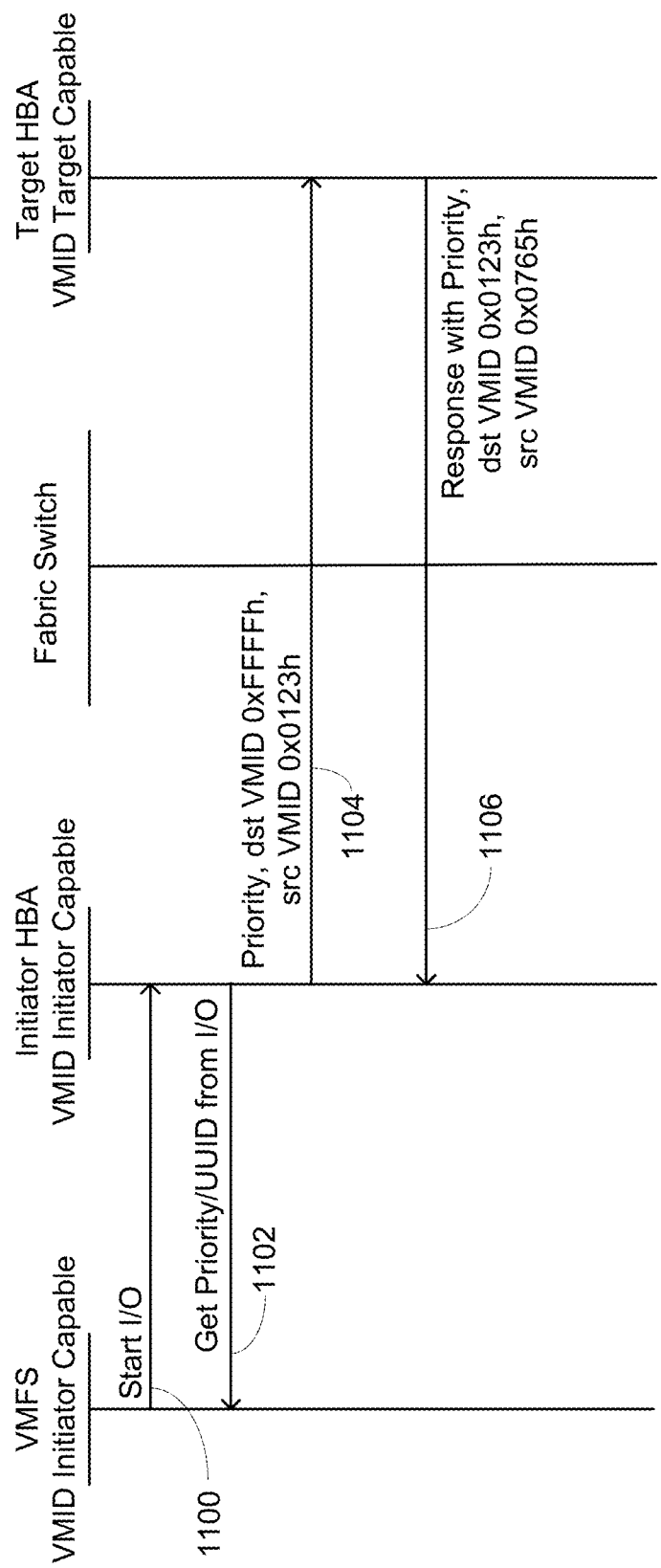
FIG. 11 is a sequence diagram of data transfer operations according to one embodiment of the present invention.

In FIG. 11 I/O operations with a VMID (VM identification) capable target are illustrated. One example where this operation could occur is path 168 between $VM_1$ in host 102 and VM$_7$ in host 108. In this discussion operations between two hosts are used for description purposes but it is understood that operations would be similar between any two VMID-aware devices, such as a storage unit and a host or two storage units. In operation 1100 I/O operations begin. In operation 1102 the initiator HBA obtains the priority and UUID (if needed), as in operation 1008. The initiator HBA processes the frame and places VMID addresses in the optional header of the frame. In operation 1104 the outgoing frame which includes a priority value as indicated in operation 1102 and source and destination VMID addresses is provided to the target HBA. The target HBA processes the frame and provides a response in operation 1106, the frame including the priority and the source and destination VMIDs.

Figure 12:
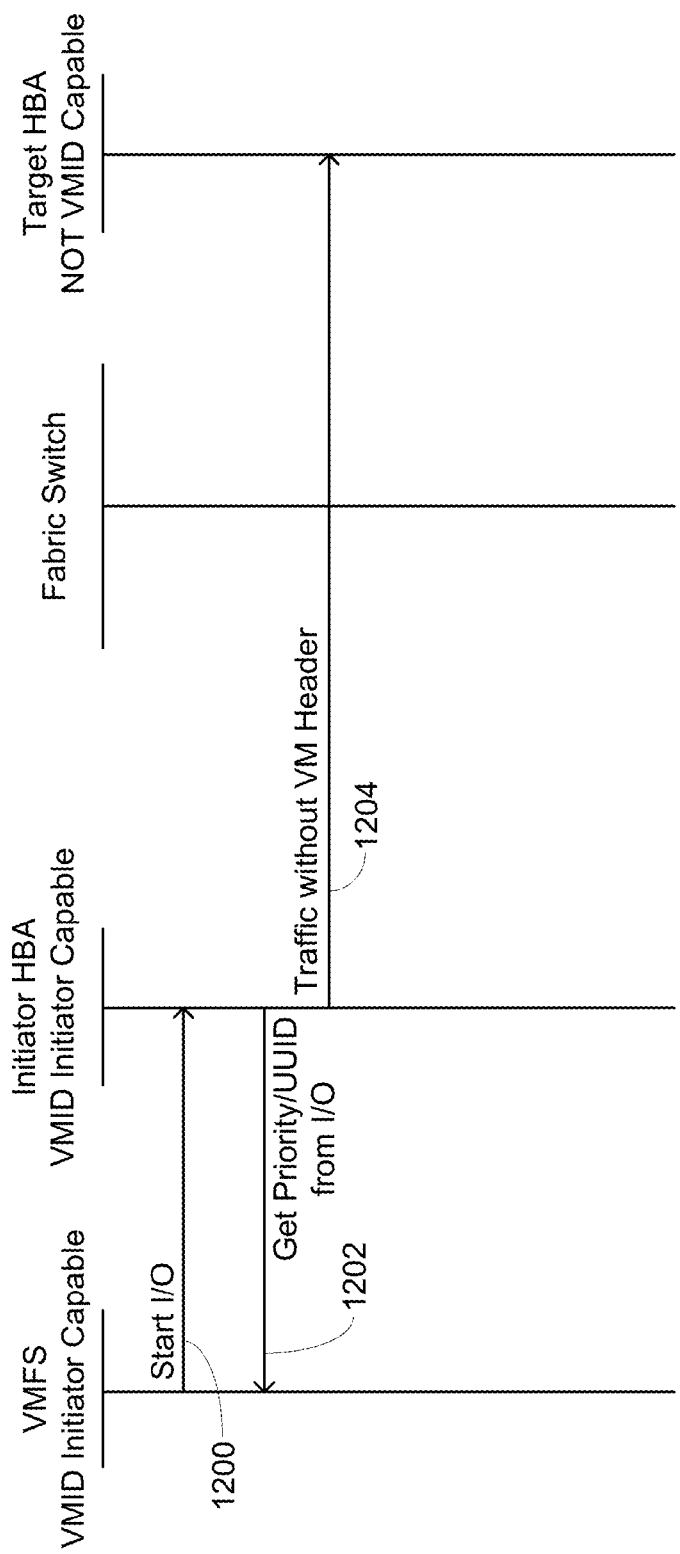
FIG. 12 is a sequence diagram of data transfer operations according to one embodiment of the present invention.

This operation is to be contrasted to that shown in FIG. 12, where the target HBA is not VMID capable. I/O operations begin in step 1200 and the initiator HBA determines the priority and UUID in operation 1202. However, as the target HBA is not VMID capable, the optional header is not included and the frame is simply provided to the target HBA in operation 1204.

In this additional embodiment the VMID is a 32 bit value, with an exemplary assignment as shown in Table 1.

TABLE 1

| VMID value | Description |
| --- | --- |
| 0x0000 | Host Machine/Physical Server ID |
| 0x0001-0x07FF | Guest Machine ID (2047 IDs) |
| 0x0800-0xFFE0 | Reserved |
| 0xFFE1-0xFFFE | Reserved for protocol |
| 0xFFFF | VMID Unknown |

As shown, in the preferred alternate embodiment the host receives a VMID of 0x0000h, with the values 0x0001h-0x07FFh being used for the various VMs on the host. A number of values are reserved for future use, a number of values are reserved for protocol use, as is common in FC and the 0xFFFFh value indicates an unknown VMID, usually used in initial operations until the HBA knows the relevant VMID.

Fibre Channel provides the capability to include optional headers. Optional headers are defined and described in Fibre Channel Framing and Signaling-3 (FC-FS-3), Rev. 0.90, dated Aug. 6, 2009 from T11, particularly Section 13. This alternate embodiment places the relevant VMID values and select other values in an optional header, as opposed to the CS_CTL bits in FIG. 6 or in the fabric ID fields of an IFR header in FIG. 7. The use of the optional header is more compatible with existing devices. The preferred optional header is a device header.

Figure 13:
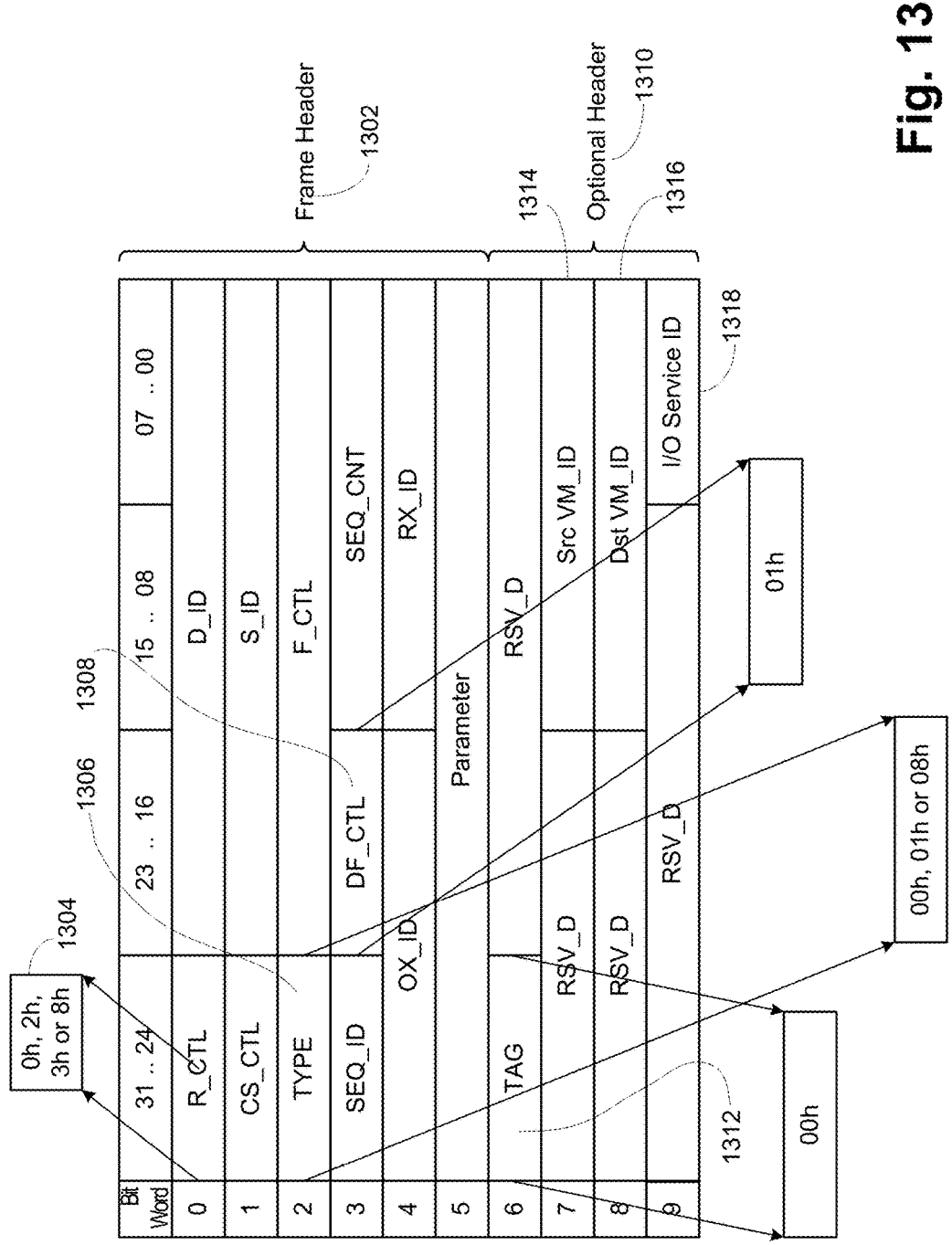
FIG. 13 is a diagram of packet headers according to one embodiment of the present invention.

FIG. 13 provides details of the fabric header and optional header of the preferred version of this alternate embodiment. The frame header 1302 is as normal, except that selected values are in certain fields. The ROUTING field of the R_CTL field 1304 has values of 0h (for device data), 2h (for extended link services), 3h (for FC-4 link data) or 8h (for basic link services). For link service encodings of the R_CTL ROUTING field, the TYPE field 1306 has values of ooh (for basic link service) or 01h (for extended link service). For data encodings of the R_CTL ROUTING field, the TYPE field 1306 has a value of 08h (for Fibre Channel Protocol (FCP)). These combinations indicate the frame is either a link service frame or an FCP frame. The DF_CTL field has a value of 01h to indicate a 16 byte device header is included. By utilizing the device header, as indicated by the DF_CTL value, the VMID information can be placed in the relevant packet types desired to monitored and evaluated.

As shown in FIG. 13, the optional header 1310 is divided into certain fields. Table 2 provided here also indicates the fields in the preferred embodiment. A TAG field 1312 should have a value of ooh. In the preferred embodiment the TAG field value of ooh indicates this is a VMID header, with 01h-FFh being reserved values for future use. A source VMID field 1314 and a destination VMID field 1316 are provided to hold the relevant VMIDs, the values of the VMIDs being discussed above. The final field is an I/O Service ID field 1318. The value in the I/O Service ID field indicates the services enabled for the source and destination VMID pair, such as encryption, compression and Quality of Service (QoS), such as high, medium and low.

TABLE 2

| Byte 3 (MSB) | Byte 2 | Byte 1 | Byte 0 (LSB) |
| --- | --- | --- | --- |
| Word 0 | TAG | Reserved | Reserved | Reserved |
| Word 1 | Reserved | Reserved | Src VMID | Src VMID |
| Word 2 | Reserved | Reserved | Dst VMID | Dst VMID |
| Word 3 | Reserved | Reserved | Reserved | I/O Service ID |

As Fibre Channel operations are between initiators and targets, operations of VMID-capable initiators and targets will be slightly different. If an initiator is VMID-capable or aware, the HBA will send packets with a VMID Header if the destination is VMID Target Capable, register the HBA capabilities with VMFS, obtain VMID feature capabilities from the VMFS, obtain priority and UUID from the VMFS, obtain UUID creation/deletion messages from the VMFS, register VMID Capabilities with the fabric, request VMID allocation from the fabric, and query VMID feature capabilities of HBAs from fabric. The HBA cannot explicitly un-register VMID initiator capability but the port going offline will un-register VMID Capability.

In a target that is VMID-capable, the HBA will receive VMID headers in the received packets from VMID-capable initiators, send back the VMID header with source and destination VMID values in response, and register VMID capabilities to the fabric. The HBA cannot explicitly un-register the VMID target capability but the port going offline will un-register VMID Capability. It is assumed that a VMID capable target will also be a VMID capable initiator to obtain the VMIDs for the various VMS and the like.

When a port is offline, the HBA on the port becomes VMID NOT Capable, VMID allocations are removed for the HBA on the port, and switch/device RSCNs will continue to occur to notify the switches and other HBAs. When the HBA port goes online, the HBA re-registers VMID capability features and the HBA re-requests VMID allocations. The switch preferably tries to assign the same VMID to the UUID.

Figure 14A:
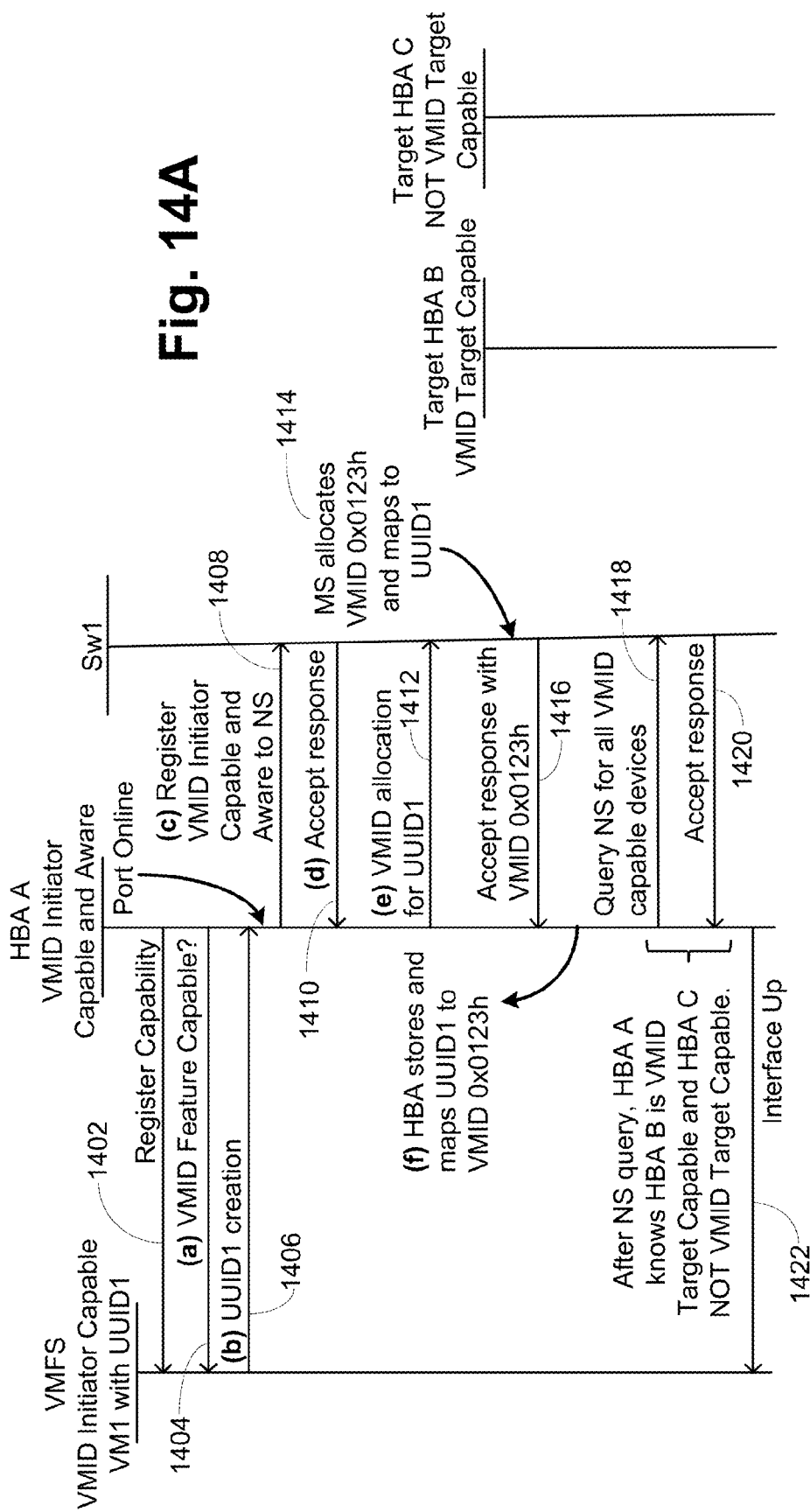
FIGS. 14A and 14B are a more detailed sequence diagram of operations according to one embodiment of the present invention.

FIG. 14A illustrates the operations of a VMID capable and aware HBA coming online, with the interactions with the switch/fabric and VMFS. A VMID-capable device has the capability of handling VMID headers but does not understand or contain VMs. A VMID-aware device is not only VMID-capable but also understand and contains VMs, allowing use of the VMID values. In operation 1402 HBA A, which is VMID initiator capable and aware, registers its HBA capabilities with VMFS. In operation 1404 the HBA A queries the VMFS to determine if it is VMID-capable. This would be done using the hypervisor storage API 228 or similar API. In operation 1406 VMFS indicates the creation of VM1 having UUID1 to the HBA A. This operation preferably includes the VM identification, the priority and the LUN and LBA range, as in step 304 above. The port of HBA A comes online at this time.

In operation 1408 the HBA A registers with the Name Server (NS) that it is VMID initiator capable and aware. As the device types of VMID Initiator and VMID Target capable and aware are not standardized FC-4 TYPE Codes, vendor specific TYPE codes can be used if desired or new standardized FC-4 TYPE codes can be allocated. In operation 1410 the NS responds with an acceptance after placing the HBA A VMID initiator capability in the NS database. In normal FC operation this capability will be replicated to all switches in the fabric based on normal NS replication. In operation 1412 the HBA A requests a VMID for UUID1 from the switch management server (MS) responsible for providing fabric addresses. Just as the fabric provides FC PIDs or addresses, the fabric also provides the VMIDs. In operation 1414 the MS allocates a VMID, 0x0123h in the illustration, and maps that VMID to UUID1. The MS coordinates with the NS so that the NS database is current and has the VMIDs and UUIDs. In operation 1416 the allocated VMID is returned to HBA A. In the preferred embodiment multiple UUIDs can be registered in a single request, with the NS then returning a bulk allocation of VMIDs. When the VMID is returned from the MS, the HBA A stores the VMID and UUID mapping in a table for later use in inserting VMID device headers.

In operation 1418 the HBA A queries the NS for all VMID capable devices, much as an HBA queries the NS for all accessible devices during fabric login. In operation 1420 the NS returns a list of all VMID capable devices. At this time the HBA A knows the capabilities of all of the other HBAs it can access. In the illustration, this means that HBA A knows that HBA B is VMID target capable but not aware and HBA C is not VMID target capable. In operation 1422 the HBA A informs VMFS that the interface is fully operational and I/O operations can begin.

Figure 14B:
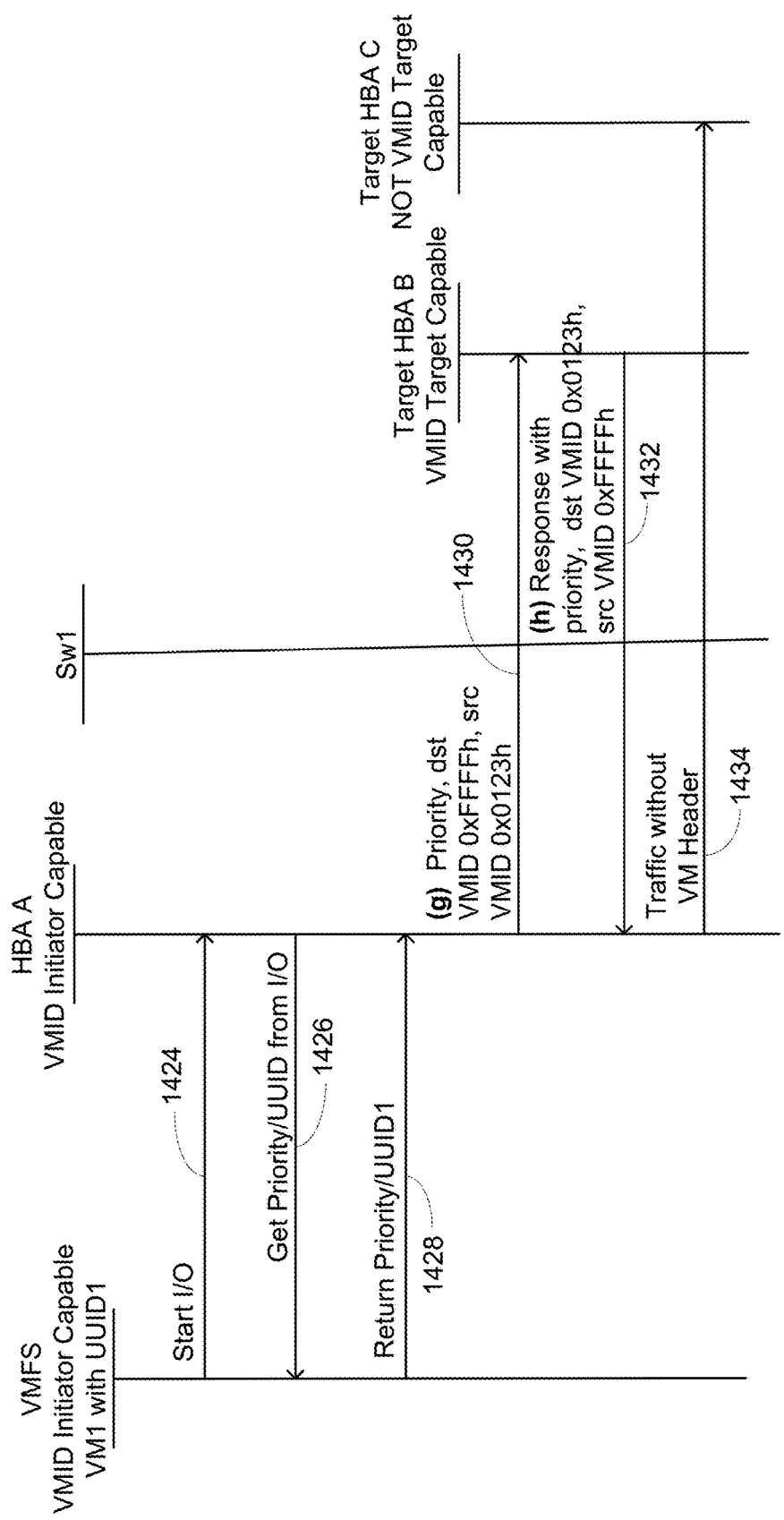

FIG. 14B is a continuation of FIG. 14A and illustrates I/O operations. In operation 1424 the VM1 begins an I/O operation, such as an FCP write. As illustrated in FIG. 5, the HBA A is snooping for relevant SCSI commands, such as the FCP write. In this embodiment the VMs are not identified in the SCSI CDB as shown in FIG. 5, so if the HBA A determines that the LUN and LBAs are not known, as the VMFS has not provided the information in operation 1406 on VM creation, then in operation 1426 the HBA A requests the information from VMFS, as shown in step 508. In operation 1428 the HBA A receives the priority, UUID and LUN/LBA information from VMFS, as in step 508. Though not illustrated, if operations 1426 and 1428 are performed, operations 1412, 1414 and 1416 may occur following operation 1428 as a VMID must be obtained for the newly identified VM. Alternatively, the switch can include an assigned VMID in the acceptance response for the first I/O operation received with a source VMID of 0xFFFFh. It is understood that operations 1426 and 1428 will not occur if VMFS has previously provided the information in operation 1406.

Having obtained the VMID, the priority and I/O frames, the HBA A now develops the VMID device header as discussed above by using the UUID to reference the previously developed table mapping UUID to VMID and other data such as priority and LUN/LBA and places the VMID device header into each frame going to the designated address if the target HBA is VMID-capable, as it is in the illustrated case. In operation 1430 the frames are transmitted according to the indicated priority and including the source and destination VMID values. In this case, as the destination VMID is not known, the value 0xFFFFh is used as the destination VMID. The HBA A transmits the frame at the desired priority according to the various methods that are available. In the preferred embodiment priority is managed by proper selection of virtual channels. The priority level may be indicated in the frame by using the CS_CTL field, may be determined by frame address and VMID value detection and then lookup in a table or other methods, depending on the particular method employed in the fabric. If the VM begins transmitting I/O operations before operations 1416 and 1420 are completed, to avoid delaying the frames the HBA A can utilize the unknown VMID value for both source and destination. Then when operations 1416 and 1420 complete or the source VMID value is otherwise provided, the propose source VMID value can be used.

The frame of operation 1430 is transmitted through the fabric, illustrated as switch1, at the designated priority level. Eventually the frame arrives at HBA B, the target, and HBA B operates on the frame as appropriate. The HBA B develops the appropriate response frame and then develops the VMID device header, the header now including a VMID value of the target VM in the host containing HBA B. In the illustration this is a VMID value of 0xFFFFh. This unknown value is used as the HBA B is VMID capable but not VMID aware, that is the HBA B can handle VMID headers but does not understand or contain VMs. If the HBA B were VMID-aware, meaning that it understood and contained VMs, then the destination VMID value would be returned, such as 0x0765h. The response frame is transmitted with the proper priority information and the VMID device header in operation 1432. When HBA A receives the frame it can store the source VMID value for use in the next frame in the I/O sequence.

If the I/O operation of operation 1424 was instead directed to an HBA C that is not VMID target capable, then in operation 1434 HBA A transmits the frame without the VMID header or the regular frame header values set to indicate an optional header.

Figure 15:
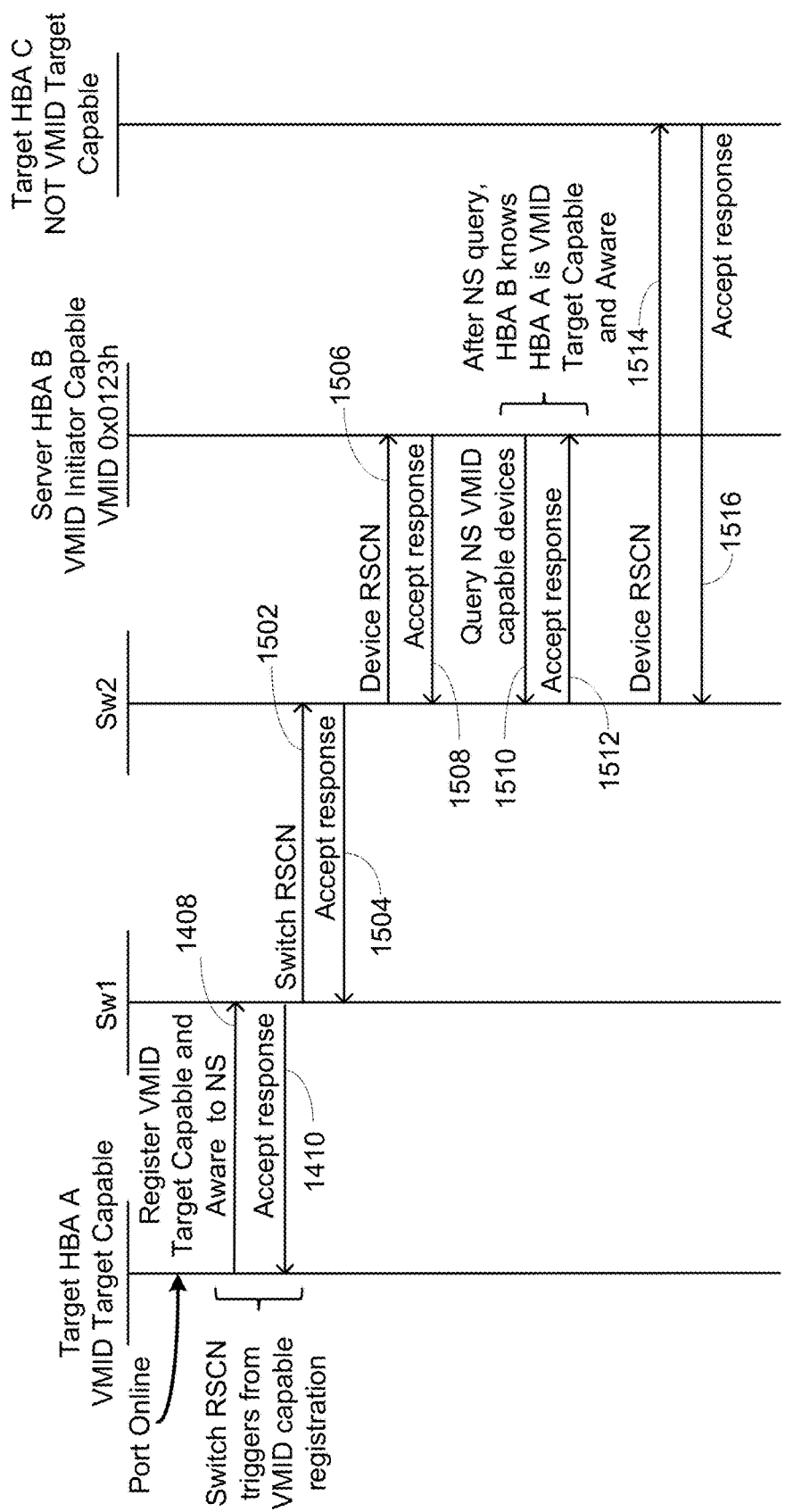
FIG. 15 is a sequence diagram of fabric operations according to one embodiment of the present invention.

The above discussion has included the interactions of a VMID capable HBA with its connected switch and the designated target nodes. However, there are additional operations that occur at a fabric level. FIG. 15 illustrates at least some of those operations. Operations 1408 and 1410, VMID target capable registration and acceptance occur. The registration triggers a switch registered state change notification (RSCN) to be sent in operation 1502 from switch1 to switch2. Switch2 responds in operation 1504 with an acceptance. Switch2 sends a device RSCN to HBA B in operation 1506. HBA B responds with an acceptance in operation 1508. As typically an RSCN contains only minimal information, in operation 1510 HBA B queries the NS for all VMID capable devices. The NS responds in operation 1512. After operation 1512 the HBA B can utilize the device RSCN of operation 1506 in conjunction with the list from operation 1512 to determine the presence of new HBA A that is VMID target capable and aware.

In operation 1514 switch2 also sends a device RSCN to HBA C, which is not VMID capable. HBA C just accepts the RSCN in operation 1516. As HBA C is not VMID capable, it does not perform the query of operation 1510.

Figure 16:
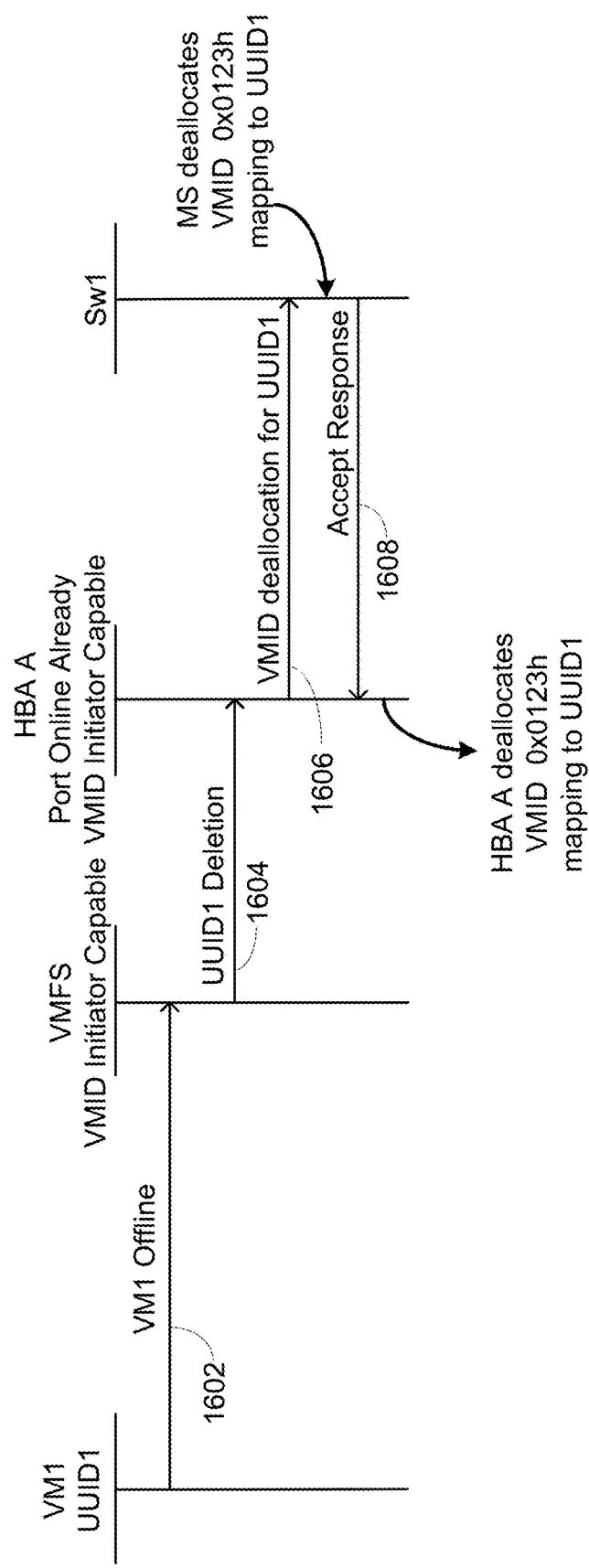
FIG. 16 is a sequence diagram of online/offline operations according to one embodiment of the present invention.

FIG. 16 illustrates the operations when a VM goes offline or is shut down. In operation 1602 the VM1 provides an indication to VMFS that is going offline. In operation 1604 the VMFS sends a message indicating the deletion of UUID1 to the HBA A. In operation 1606 the HBA A indicates the deallocation of UUID1 to switch1. Switch 1 deallocates VMID 0x0123h from the MS and the NS, along with the mapping to UUID1. In operation 1608 the switch provides an accept response to the HBA A. The HBA A can then remove UUID1 and its VMID from its table.

While the alternate embodiment is described using Fibre Channel frames and an HBA as the exemplary format, it is understood that the same optional device header could be sued in FCoE with a CNA.

The use of the optional device header in this alternate embodiment provides greater compatibility and requires fewer proprietary changes as compared to the embodiments of FIGS. 6 and 7 while also providing additional flexibility.

Figure 17:
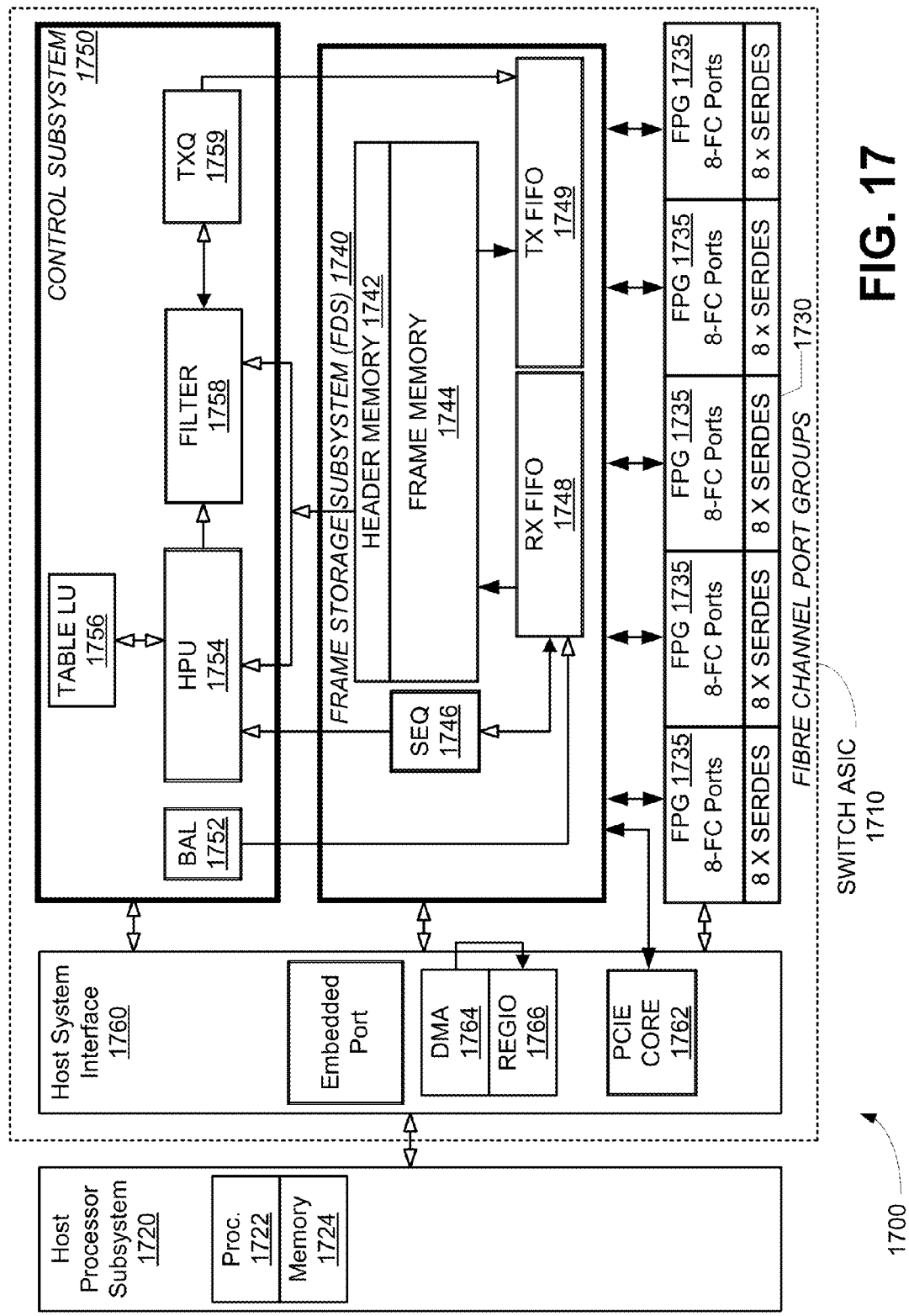
FIG. 17 is a block diagram illustrating a network switch according to one embodiment of the present invention.

FIG. 17 illustrates an exemplary Fibre Channel switch for use with the various embodiments. The primary components of the switch are a 40-port Fibre Channel switch ASIC 1710 that is combinable with a host processor subsystem 1720 to provide a complete 40-port Fibre Channel network switch 1700. Multiple ASICs 1710 can be arranged in various topologies to provide higher port count, modular switch chassis. The ASIC 1710 and host processor system 1720 are illustrative and by way of example only, and other hardware implementations can be used as desired.

The ASIC 1710 comprises four major subsystems at the top-level as shown in FIG. 17: A Fibre Channel Protocol Group Subsystem 1730, a Frame Storage Subsystem 1740, a Control Subsystem 1750, and a Host System Interface 1760. Some features of the ASIC 1710 that are not relevant to the current discussion have been omitted for clarity of the drawing.

The Fibre Channel Protocol Group (FPG) Subsystem 1730 comprises 5 FPG blocks 1735, each of which contains 8 port and SERDES logic blocks to a total of 40 E, F, and FL ports.

The Frame Data Storage (FDS) Subsystem 1740 contains the centralized frame buffer memory and associated data path and control logic for the ASIC 1710. The frame memory is separated into two physical memory interfaces: a header memory 1742 to hold the frame header and a frame memory 1744 to hold the payload. In addition, the FDS 1740 includes a sequencer 1746, a receive FIFO buffer 1748 and a transmit buffer 1749.

The Control Subsystem 1750 comprises a Buffer Allocation unit (BAL) 1752, a Header Processor Unit (HPU) 1754, a Table Lookup Unit (Table LU) 1756, a Filter 1758, and a Transmit Queue (TXQ) 1759. The Control Subsystem 1750 contains the switch control path functional blocks. All arriving frame descriptors are sequenced and passed through a pipeline of the HPU 1754, filtering blocks 1758, until they reach their destination TXQ 1759. The Control Subsystem 1750 carries out L2 switching, FCR, LUN Zoning, LUN redirection, Link Table Statistics, VSAN routing and Hard Zoning.

The Host System Interface 1760 provides the host processor subsystem 1720 with a programming interface to the ASIC 1710. It includes a Peripheral Component Interconnect Express (PCIe) Core 1762, a DMA engine 1764 to deliver frames and statistics to and from the host, and a top-level register interface block 1766. As illustrated in FIG. 17, the ASIC 1710 is connected to the Host Processor Subsystem 1720 via a PCIe link controlled by the PCIe Core 1762, but other architectures for connecting the ASIC 1710 to the Host Processor Subsystem 1720 can be used.

Some functionality described above can be implemented as software modules in an operating system or application running on a processor 1722 of the host processor subsystem 1720 and stored in a memory 1724 or other storage medium of the host processor subsystem 1720. This software may be provided during manufacture of the ASIC 1710, or provided on any desired computer-readable medium, such as an optical disc, and loaded into the ASIC 1710 at any desired time thereafter. In one embodiment, the control subsystem 1750 is configured by operating system software of the network switch 1700 executing in the processor 1722 of the host processor subsystem 1720.

Serial data is recovered by the SERDES of an FPG block 1735 and packed into ten (10) bit words that enter the FPG subsystem 1730, which is responsible for performing 8b/10b decoding, CRC checking, min and max length checks, disparity checks, etc. The FPG subsystem 1730 sends the frame to the FDS subsystem 1740, which transfers the payload of the frame into frame memory and the header portion of the frame into header memory. The location where the frame is stored is passed to the control subsystem, and is used as the handle of the frame through the ASIC 1710. The Control subsystem 1750 reads the frame header out of header memory and performs routing, classification, and queuing functions on the frame. Frames are queued on transmit ports based on their routing, filtering and QoS. Transmit queues de-queue frames for transmit when credits are available to transmit frames. When a frame is ready for transmission, the Control subsystem 1750 de-queues the frame from the TXQ 1759 for sending through the transmit FIFO back out through the FPG 1730.

The Header Processor Unit (HPU) 1754 performs header HPU processing with a variety of applications through a programmable interface to software, including (a) Layer2 switching, (b) Layer3 routing (FCR) with complex topology, (c) Logical Unit Number (LUN) remapping, (d) LUN zoning, (e) Hard zoning, (f) VSAN routing, (g) Selective egress port for QoS, and (g) End-to-end statistics.

The HPU 1754 provides hardware capable of encapsulating and routing frames across inter-switch links that are connected to the ports 1735 of the ASIC 1710. The HPU 1754 performs frame header processing and Layer 3 routing table lookup functions using routing tables where routing is required, encapsulating the frames based on the routing tables, and routing encapsulated frames. The HPU 1754 can also bypass routing functions where normal Layer2 switching is sufficient.

Figure 18:
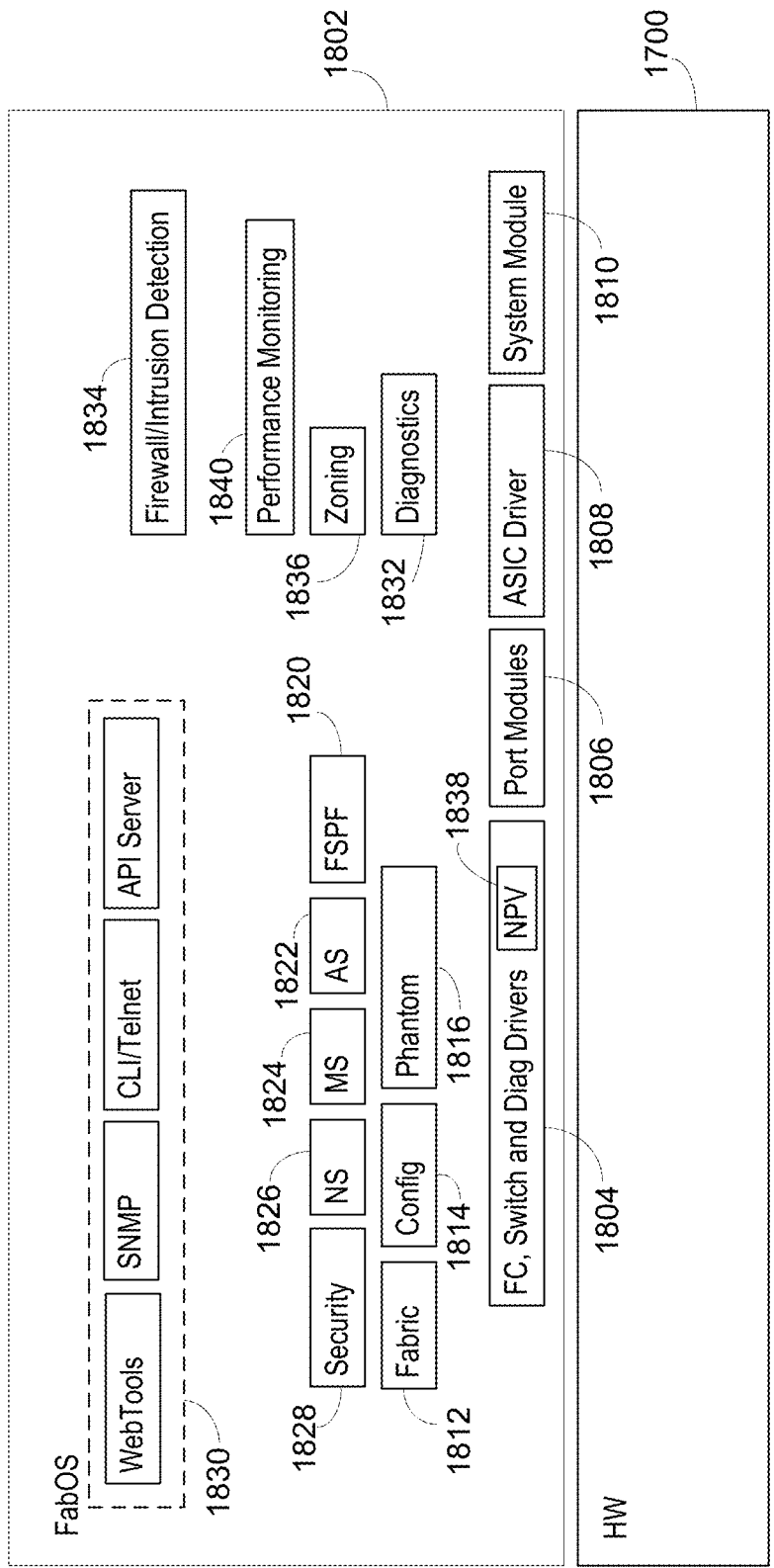
FIG. 18 is an illustration of the software modules in the switch of FIG. 17 according to one embodiment of the present invention.

Proceeding then to FIG. 18, a general block diagram of the switch hardware and software is shown. Block 1700 indicates the hardware as previously described. Block 1802 is the basic software architecture of the switch 1700. Generally think of this as the switch fabric operating system and all of the particular modules or drivers that are operating within that embodiment. Modules operating on the operating system 1802 are Fibre Channel, switch and diagnostic drivers 1804; port modules 1806, if appropriate; a driver 1808 to work with the Fibre Channel ASIC 1710; and a system module 1810. Other switch modules include a fabric module 1812, a configuration module 1814, a phantom module 1816 to handle private-public address translations, an FSPF or Fibre Shortest Path First routing module 1820, an AS or alias server module 1822, an MS or management server module 1824, a name server module 1826 and a security module 1828. Additionally, the normal switch management interface 1830 is shown including web server, SNMP, telnet and API modules. A virtual node port module 1838 performs the node port virtualization function. This module 1838 is included in the drivers 1804 in the preferred embodiment.

General operation of the management server and the name server are well known to those skilled in the art and are extended as discussed above. Further explanation of the functions of the two servers is provided in specifications Fibre Channel Generic Service-6 (FC-GS-6), dated Aug. 30, 2007; Fibre Channel Link Services (FC-LS-2), dated Jun. 26, 2008; Fibre Channel Switch Fabric-5 (FC-SW-5), dated Jun. 3, 2009, al from T11 and all of which are hereby incorporated by reference.

The above description is illustrative and not restrictive. Many variations of the invention will become apparent to those skilled in the art upon review of this disclosure. The scope of the invention should therefore be determined not with reference to the above description, but instead with reference to the appended claims along with their full scope of equivalents.

What is claimed is:

1. An apparatus comprising:
a host computer;
a storage area network (SAN) interface connected to the host computer and for coupling to a SAN; and
a hypervisor executing on the host computer,
wherein the SAN interface determines that a command has been received from the hypervisor for an unknown LUN/LBA;
wherein the SAN interface queries the hypervisor to determine virtual machine (VM) information related to the LUN/LBA;
wherein the hypervisor provides VM information to the SAN interface in response to the query,
wherein the SAN interface incorporates a source unique identifier based on the VM information into outgoing frames to allow the frames to be identified with a VM throughout the SAN,
wherein the SAN interface incorporates a destination unique identifier into one or more of the frames, the destination unique identifier identifying a destination VM to forward the one or more of the frames to, and
wherein the one or more of the frames have a Fibre Channel portion and the source and the destination unique identifiers are incorporated into an optional header in the Fibre Channel portion.

2. The apparatus of claim 1, wherein the hypervisor includes a storage application programming interface (API),
wherein the SAN interface includes a driver executing on the host computer, and
wherein the driver provides the query to the storage API of the hypervisor.

3. The apparatus of claim 1, wherein the optional header is a device header.

4. The apparatus of claim 1, wherein the SAN interface is a host bus controller (HBA) and the frame is a Fibre Channel frame.

5. The apparatus of claim 1, wherein the SAN interface is a converged network adapter (CNA) and the frame is a Fibre Channel over Ethernet (FCoE) frame.

6. The apparatus of claim 1, wherein the SAN interface provides the VM information to a switch and receives the source unique identifier from the switch.

7. A network interface comprising:
a driver for executing on a host computer and interfacing with a hypervisor; and
a hardware portion for coupling to a storage area network;
wherein the driver and the hardware portion cooperate to request and in response receive virtual machine (VM) information from the hypervisor,
wherein the hardware portion incorporates a source unique identifier based on the VM information into frames provided from the network interface,
wherein the hardware portion incorporates a destination unique identifier in one or more of the frames, the destination unique identifier identifying a destination VM to forward the one or more of the frames to, and
wherein the one or more of the frames have a Fibre Channel portion and the source and the destination unique identifiers are incorporated into an optional header in the Fibre Channel portion.

8. The network interface of claim 7, wherein the hypervisor includes a storage application programming interface (API),
wherein the network interface determines that a command has been received from the hypervisor for an unknown LUN/LBA,
wherein the driver queries the hypervisor using the storage API to determine virtual machine (VM) information related to the LUN/LBA, and
wherein the driver receives VM information from the hypervisor in response to the query.

9. The network interface of claim 7, wherein the optional header is a device header.

10. The network interface of claim 7, wherein the network interface is a host bus controller (HBA) and the frame is a Fibre Channel frame.

11. The network interface of claim 7, wherein the network interface is a converged network adapter (CNA) and the frame is a Fibre Channel over Ethernet (FCoE) frame.

12. The network interface of claim 7, wherein the network interface provides the VM information to a switch and receives the source unique identifier from the switch.

13. The network interface of claim 7, wherein the network interface registers its capabilities of incorporating the source unique identifier into frames with a fabric name server.

14. The network interface of claim 13, wherein the network interface queries the fabric name server for other network interfaces which incorporate the source unique identifier into frames,
wherein the network interface receives a list of other network interfaces which incorporate the source unique identifier into frames from the fabric name server, and
wherein the network interface only incorporates the source unique identifier in the frame if the receiving network interface was included in the list of other network interfaces which incorporate the source unique identifier into frames received from the fabric name server.

15. A method comprising:
requesting, by a network interface, virtual machine (VM) information from a hypervisor;
receiving, by the network interface, VM information from the hypervisor;
incorporating, by the network interface, a source unique identifier based on the VM information into frames provided from the network interface; and
incorporating, by the network interface, a destination unique identifier into the frames, the destination unique identifier identifying a destination VM to forward the frames to,
wherein the network interface includes a driver and a hardware portion,
wherein the hypervisor includes a storage application programming interface (API),
wherein the driver includes a driver API,
wherein requesting VM information from a hypervisor includes:

the network interface determining that a command has been received from the hypervisor for an unknown LUN/LBA; and the driver querying the hypervisor using the storage API to determine the VM information related to the LUN/LBA, wherein the driver receives the VM information from the hypervisor using the driver API in response to the query, and wherein the frames have a Fibre Channel portion and the source and the destination unique identifiers are incorporated into an optional header in the Fibre Channel portion.

16. The method of claim 15, wherein the optional header is a device header.

17. The method of claim 15, wherein the network interface is a host bus controller (HBA) and the frame is a Fibre Channel frame.

18. The method of claim 15, wherein the network interface is a converged network adapter (CNA) and the frame is a Fibre Channel over Ethernet (FCoE) frame.

19. The method of claim 15, wherein the network interface provides the VM information to a switch and receives the source unique identifier from the switch.

20. The method of claim 15, wherein the network interface registers its capabilities of incorporating the source unique identifier into frames with a fabric name server.

21. The method of claim 20, wherein the network interface queries the fabric name server for other network interfaces which incorporate the source unique identifier into frames, wherein the network interface receives a list of other network interfaces which incorporate the source unique identifier into frames from the fabric name server, and wherein the network interface only incorporates the source unique identifier in the frame if the receiving network interface was included in the list of other network interfaces which incorporate the source unique identifier into frames received from the fabric name server.

* * * * *